(12) United States Patent
Abdelgany et al.

(10) Patent No.: US 7,092,676 B2
(45) Date of Patent: Aug. 15, 2006

(54) SHARED FUNCTIONAL BLOCK MULTI-MODE MULTI-BAND COMMUNICATION TRANSCEIVERS

(75) Inventors: MohyEldeen Fouad Abdelgany, Irvine, CA (US); Dana Vincent Laub, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 220 days.

(21) Appl. No.: 10/444,803

(22) Filed: May 23, 2003

(65) Prior Publication Data

US 2003/0193923 A1 Oct. 16, 2003

Related U.S. Application Data

(63) Continuation-in-part of application No. 09/298,315, filed on Apr. 23, 1999, now Pat. No. 6,584,090.

(51) Int. Cl.
*H04B 1/40* (2006.01)
*H04M 1/00* (2006.01)

(52) U.S. Cl. .................. 455/76; 455/552.1; 455/324

(58) Field of Classification Search ............ 455/550.1, 455/552.1, 553.1, 76, 324, 323, 314, 339, 455/303, 307; 375/302, 322, 324
See application file for complete search history.

(56) References Cited

U.S. PATENT DOCUMENTS

| | | | | |
|---|---|---|---|---|
| 5,204,977 A * | 4/1993 | Feldt | ................... | 455/234.2 |
| 5,230,011 A * | 7/1993 | Gielis et al. | ................ | 375/344 |
| 5,422,889 A * | 6/1995 | Sevenhans et al. | ......... | 370/442 |
| 5,548,831 A * | 8/1996 | Bijker et al. | ................. | 455/207 |
| 5,722,053 A | 2/1998 | Kornfeld et al. | ............... | 455/86 |
| 5,724,653 A * | 3/1998 | Baker et al. | ................. | 455/296 |
| 5,732,330 A | 3/1998 | Anderson et al. | ............. | 455/76 |
| 5,896,562 A | 4/1999 | Heinonen | ................... | 455/76 |
| 5,926,500 A * | 7/1999 | Odenwalder | ................. | 375/144 |
| 5,966,666 A | 10/1999 | Yamaguchi et al. | ......... | 455/552 |
| 5,983,081 A * | 11/1999 | Lehtinen | ..................... | 455/76 |
| 6,014,551 A * | 1/2000 | Pesola et al. | ................. | 455/86 |

(Continued)

FOREIGN PATENT DOCUMENTS

EP 95302359.5 10/1995

(Continued)

OTHER PUBLICATIONS

Article 115(1) EPC Written Observations by -CO Global Communications Limited, XP-002186216, European Patent Application No. 92308604.5 of TRW Inc. for authority to construct a new communications satellite system, Odyssey$^{SM}$, dated May 31, 1991, pp. 1-101.

(Continued)

*Primary Examiner*—Nguyen T. Vo
(74) *Attorney, Agent, or Firm*—Thomas, Kayden, Horstemeyer & Risley, LLP

(57) ABSTRACT

A multiple-mode multiple band transceiver is disclosed. Some embodiments include a multiple-channel transmitter including a plurality of selectable transmit-channel components, the plurality of selectable transmit-channel components sharing at least one element coupled to a modulator, the plurality of selectable transmit channel components forming at least first and second transmit channels configured to generate radio-frequency signals using at least a first and a second multiple-access modulation technique, and a first switch configured to enable at least one of the first and second transmit channels to transmit a communication signal using at least one of the first and the second multiple-access modulation techniques.

41 Claims, 16 Drawing Sheets

U.S. PATENT DOCUMENTS

| | | | |
|---|---|---|---|
| 6,052,366 A | 4/2000 | Suzuki | 370/342 |
| 6,122,270 A | 9/2000 | Whinnett et al. | 370/342 |
| 6,160,801 A | 12/2000 | Uchida et al. | 370/337 |
| 6,169,733 B1 | 1/2001 | Lee | 370/342 |
| 6,175,746 B1 | 1/2001 | Nakayama et al. | 455/552 |
| 6,185,434 B1* | 2/2001 | Hagstrom et al. | 455/552.1 |
| 6,198,730 B1 | 3/2001 | Hogberg et al. | 370/320 |
| 6,201,952 B1* | 3/2001 | Shimizu et al. | 455/180.1 |
| 6,415,001 B1 | 7/2002 | Li et al. | 375/259 |
| 6,430,150 B1 | 8/2002 | Azuma et al. | 370/218 |
| 6,584,090 B1 | 6/2003 | Abdelgany et al. | 370/342 |
| 6,675,024 B1* | 1/2004 | Loke et al. | 455/553.1 |
| 6,694,129 B1* | 2/2004 | Peterzell et al. | 455/76 |
| 6,714,760 B1* | 3/2004 | Robinett | 455/3.02 |
| 6,728,517 B1* | 4/2004 | Sugar et al. | 455/73 |
| 6,735,426 B1* | 5/2004 | Pau | 455/255 |
| 6,912,406 B1* | 6/2005 | Lahlum et al. | 455/553.1 |
| 6,980,774 B1* | 12/2005 | Shi | 455/73 |
| 2003/0092416 A1* | 5/2003 | Tanaka et al. | 455/323 |

FOREIGN PATENT DOCUMENTS

| | | |
|---|---|---|
| WO | WO 97/30523 | 8/1997 |
| WO | WO 00/11797 | 3/2000 |

OTHER PUBLICATIONS

Article entitled "Odyssey—A Satellite-Based Personal Communication System" by Michael Horstein, TRW Space and Electronics Group, dated 1993 IEEE, XP-010198212, pp. 291-298.

Article entitled "The GSM 900, DCS 1800 and PCS 1900 systems in the wireless world of the future" by Pourtaheri et al., Ericsson Review No. 3, dated 1996, XP-000629580, pp. 105-112.

Article entitled Digital cellular telecommunications system (Phase 2+); Radio transmission and reception (GSM 05.05 version 7.1.1. Release 1998); European Standard (Telecommunications series) ETSI EN 300 910 v7.1.1 (Dec. 1999), pp. 1-68.

Tetsu Sakata, Kazuhiko Seki, Shuji Kubota and Shuzo Kato, "π/4-shift QPSK Digital Modulator LSIC for Personal Communication Terminals", 5th IEEE International Symposium on Personal, Indoor and Mobile Radio Communications (PIMRC '94), The Hague, The Netherlands, pp. 472-475, Sep. 18-22, 1994.

PCT International Search Report dated Aug. 1, 2000.

* cited by examiner

SHARED FUNCTIONAL BLOCK MULTI-MODE MULTI-BAND COMMUNICATION TRANSCEIVERS

CROSS-REFERENCE TO RELATED APPLICATION

This application is a continuation-in-part of U.S. utility application entitled, "System and Process for Shared Functional Block CDMA and GSM Communication Transceivers," having Ser. No. 09/298,315, filed Apr. 23, 1999, now U.S. Pat. No. 6,584,090, which is entirely incorporated herein by reference.

BACKGROUND OF THE INVENTION

1. Field of the Invention

The shared functional block multi-mode multi-band transceiver relates generally to communication systems which use radio-frequency (RF) transmitters and receivers (transceivers), and in particular embodiments, to systems and methods for multi-mode, multi-band Code Division Multiple Access (CDMA) and Global System for Mobile (GSM) communication transceivers that share functional blocks to minimize size, weight, complexity, power consumption, cost, etc.

2. Related Art

It has become increasingly important to minimize the size, weight, complexity, power consumption, and cost of various electronic devices, especially personal communication devices such as cellular telephones, personal pagers, cordless telephones, and the like. One way to minimize such characteristics is to minimize the number of components and functions required in the electronic device, or to perform multiple functions using the same components. However, personal communication devices such as cellular telephones often require complex circuitry with a number of power-inefficient components for performing particular functions. This is especially true in modern cellular communications, where several different communication standards are employed worldwide, and cellular telephones with the flexibility to operate under multiple communications standards are highly desirable from a consumer and manufacturing perspective.

For example, the GSM communication standard is a world-wide mode of digital cellular communication operating over three different frequency bands. GSM-900 operates in the 900 MHz frequency band and is currently used in Europe and Asia. Data Communications System (DCS) is another digital cellular standard based on GSM technology, operating in the 1800 MHz frequency band and also currently used in Europe and Asia. The United States uses Personal Communications System (PCS), a third digital cellular standard similar to DCS, but operating in the 1900 MHz band. GSM is currently used in approximately 154 countries, including the geographic areas of North Africa, India, China, Europe, the Middle East, and Taiwan.

However, GSM is not the only mode of cellular communication. CDMA is another mode of digital cellular communication operating in either the 900 or 1900 MHz band. CDMA is one of the most widely used modes of cellular communication in the United States, and is the most widely used mode of cellular communication in Korea. CDMA is also being used in China, India, and Taiwan.

With improved voice and data communications and political climates continuing to expand the world market, a "world telephone" capable of operating in many different countries would be of interest to international business travelers. Multi-mode, multi-band cellular telephones with shared functionality and an optimized architecture capable of operating under all of these standards would afford consumers widespread applicability and would allow manufacturers to benefit from the cost efficiency of a common design.

However, multi-mode, multi-band cellular telephones such as combined CDMA/GSM telephones present a number of design challenges. Conventional single-band transmitters typically require two separate frequencies, a fixed intermediate frequency (IF) for modulation and a tunable RF for upconversion. Conventional single-band receivers also typically require two separate frequencies, a tunable RF for downconversion and a fixed IF for demodulation. Thus, a single-band cellular telephone may require as many as four different frequency sources. CDMA/GSM multi-band and multi-mode cellular telephones exacerbate the problem because the modulation, upconversion, downconversion, and demodulation processes for each band and mode may operate at different frequencies and amplitudes. Furthermore, the frequencies and amplitudes employed by each band and mode may require different filters and amplifiers for the transmit and receive function of each band. The design challenge of producing cellular telephones of minimal size, weight, complexity, power consumption, and cost is thus compounded by multi-mode, multi-band cellular telephones.

SUMMARY

Therefore, it is an object of embodiments of the shared functional block multi-mode multi-band transceiver to provide a system and process for a multi-mode, multi-band communication transceiver that shares functional blocks to minimize size, weight, complexity, power consumption, and cost.

Some embodiments include a communication system for communicating CDMA and GSM transmit and receive RF information signals through one or more antennas. The communication system is comprised of a transmitting unit, a receiving unit, and at least one antenna. The transmitting unit modulates and upconverts a transmit baseband information signal to generate a CDMA transmit RF information signal and a GSM transmit RF information signal. The receiving unit downconverts and demodulates a CDMA receive RF information signal and a GSM receive RF information signal to generate a receive baseband information signal. One or more antennas are coupled to the transmitting unit and receiving unit for transmitting the CDMA transmit RF information signal and the GSM transmit RF information signal, and receiving the CDMA receive RF information signal and the GSM receive RF information signal.

The transmitting unit comprises a modulator for modulating a transmit IF local oscillator frequency (LO) with the transmit baseband information signal to generate a transmit IF information signal. It also includes a plurality of upconverters for upconverting the transmit IF information signal with a GSM transmit RF LO to generate the GSM transmit RF information signal, and for upconverting the transmit IF information signal with a CDMA transmit RF LO to generate the CDMA transmit RF information signal.

The receiving unit comprises a downconverter for downconverting the CDMA receive RF information signal with a receive RF LO to generate a receive IF information signal, and for downconverting the GSM receive RF information signal with the receive RF LO to generate a receive IF information signal. It also includes a demodulator for demodulating the receive IF information signal with a receive IF LO to generate the receive baseband information signal.

A transmit IF variable gain amplifier is coupled between the modulator and the plurality of upconverters for amplifying the transmit IF information signal. The plurality of upconverters includes a translation loop for upconverting the transmit IF information signal with the GSM transmit RF LO, and an upconverter mixer for upconverting the transmit IF information signal with the CDMA transmit RF LO.

A translational loop or offset PLL is suitable for upconverting IF signals for constant envelope modulation techniques such as GSM. However, these upconversion techniques cannot be applied with communication protocols that do not use a modulation technique having a constant envelope such as Wideband Code Division Multiple Access (WCDMA), and Enhanced Data for GSM evolution (EDGE), a 2.5 GHz extension of GSM/General Packet Radio System (GPRS) systems. A direct launch transmission technique is proposed for implementing multi-mode multi-band transceivers compatible with multiple communication standards.

These and other objects, features, and advantages of embodiments of the shared functional block multi-mode multi-band transceiver will be apparent to those skilled in the art from the following detailed description of embodiments of the invention, when read with the drawings and appended claims. It is intended that all such additional systems, methods, features, and advantages be included within this description, be within the scope of the transceiver, and be protected by the accompanying claims.

BRIEF DESCRIPTION OF THE FIGURES

The shared functional block multi-mode multi-band transceiver can be better understood with reference to the following figures. The components within the figures are not necessarily to scale, emphasis instead being placed upon clearly illustrating the principles of the transceiver. Moreover, in the figures, like reference numerals designate corresponding parts throughout the different views.

DETAILED DESCRIPTION

Figure 1:
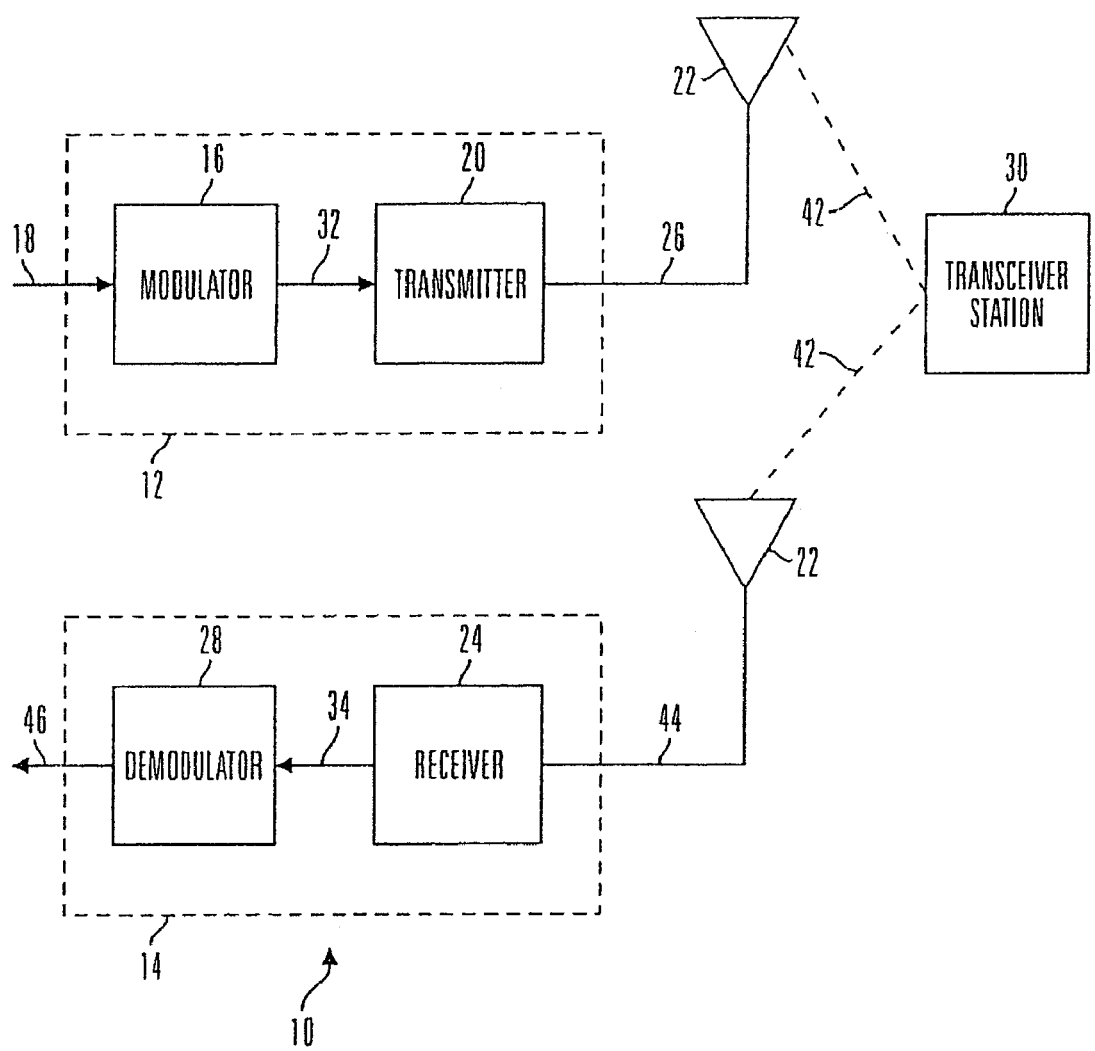
FIG. 1 is a block diagram illustrating an embodiment of a system environment suited for various embodiments of shared functional block multi-mode multi-band communication transceivers.

In the following description of preferred embodiments, reference is made to the accompanying drawings, which form a part hereof, and in which are shown by way of illustration, specific embodiments in which the shared functional block multi-mode multi-band transceiver may be implemented. It is to be understood that other embodiments may be utilized and structural changes may be made without departing from the scope of the multi-mode multi-band communication transceivers.

Cellular communication systems employ several different communication standards worldwide and utilize several different frequency bands. For example, the GSM communication standard operates over three different bands, 900 MHz, 1800 MHz, and 1900 MHz, while the CDMA communication standard operates over two different bands, 900 MHz and 1900 MHz. Multi-mode, multi-band cellular telephones, with the flexibility to operate under multiple communications standards, afford consumers widespread applicability and allow manufacturers to benefit from the cost-efficiency of a common design.

To realize a cost-efficient design, multi-mode, multi-band cellular telephones should minimize size, weight, complexity, and power consumption. Embodiments of the shared functional block multi-mode multi-band transceiver therefore relate to multi-mode, multi-band cellular communication transceivers that share frequency sources, amplifiers, and mixers between bands and modes. It should be noted, however, that transceivers according to embodiments of the shared functional block multi-mode multi-band transceiver are not unique to cellular communications and may be employed in a variety of communications electronics, including wireless transmission systems as well as wired systems. Thus, embodiments of the shared functional block multi-mode multi-band transceiver described herein may involve various forms of communications systems. However, for purposes of simplifying the present disclosure, preferred embodiments are described herein in relation to personal wireless communications systems, including, but not limited to digital mobile telephones, digital cordless telephones, digital pagers, combinations thereof, and the like. Such personal communications systems typically include one or more portable or remotely located receiver and/or transmitter units.

Regardless of the form of the communication system, embodiments of the shared functional block multi-mode multi-band transceiver combine at least two communication modes, GSM and CDMA. In CDMA-900, frequency bands are allocated such that a mobile subscriber unit will transmit signals over a transmit band of about 824–849 MHz and receive signals over a receive band of about 869–894 MHz. In CDMA-1900, frequency bands are allocated such that a mobile subscriber unit will transmit signals over a transmit band of about 1850–1910 MHz and receive signals over a receive band of about 1930–1990 MHz. Note that CDMA functional blocks employed in embodiments of the shared functional block multi-mode multi-band transceiver should conform to Telecommunications Industry Association (TIA)/Electronic Industry Association (EIA)/Interim Standard (IS) "CDMA-900" (TIA/ELA/AS-95-A and TIA/EIA/IS-98-A), and American National Standards Institute, Inc. (ANSI) "CDMA-1900" (J-STD-018), standards that are well understood by those skilled in the art. These standards are incorporated herein by reference.

GSM is used herein to refer generally to three different applications of the GSM communication standard, GSM-900, DCS, and PCS. In GSM-900, frequency bands are allocated such that a mobile subscriber unit will transmit signals over a transmit band of between about 890 and 915 MHz and will receive signals over a receive band of between about 935 to 960 MHz. The transmit band is broken up into 125 channels, each channel separated by 200 kHz. In DCS, frequency bands are allocated such that a mobile subscriber unit will transmit signals over a transmit band of between about 1710 and 1785 MHz and will receive signals over a receive band of between about 1805 and 1880 MHz. The transmit band is broken up into 375 channels, each channel separated by 200 kHz. In PCS, frequency bands are allocated such that a mobile subscriber unit will transmit signals over a transmit band of between about 1850 and 1910 MHz and will receive signals over a receive band of between about 1930 and 1990 MHz The transmit band is broken up into 300 channels, each channel separated by 200 kHz. It should be noted that GSM functional blocks employed in embodiments of the shared functional block multi-mode multi-band transceiver conform to European Telecommunications Standards Institute (ETSI) "GSM-900 & DCS-1800" (GSM 05.05, GSM 11.10-1, and TBR 5) and American National Standards Institute, Inc. (ANSI) "GSM-1900" (JSTD-007 Volumes 0–7), standards that are well understood by those skilled in the art. These standards are incorporated herein by reference.

Thus, embodiments of the shared functional block multi-mode multi-band transceiver include the following GSM/CDMA combinations: CDMA-900 and GSM-900, CDMA-900 and DCS, CDMA-900 and PCS, CDMA-1900 and GSM-900, CDMA-1900 and DCS, and CDMA-1900 and PCS. It should be noted, however, that although the illustrated embodiments include dual-mode, dual-band transceivers and tri-mode, tri-band transceivers, alternative embodiments of the shared functional block multi-mode multi-band transceiver are contemplated. For example, multi-mode multi-band transceivers may include various architectures that support the aforementioned modes of communication along with General Packet Radio Service (GPRS), Enhanced Data for GSM Evolution (EDGE), Universal Mobile Telecommunications System (UMTS), Time Division Duplex—Wideband Code Division Multiple Access (TDD-WCDMA), TD-SCMA, CDMA 2000, among others. In some of these embodiments PCS and DCS transmit and receive paths may contain paralleled filters to accommodate the relatively slight frequency differences between PCS and DCS.

A generalized representation of a communication system according to an embodiment of the shared functional block multi-mode multi-band transceiver is shown in FIG. 1, wherein a transceiver 10 includes a transmitting unit 12 and a receiving unit 14, coupled for communication over a communication channel 42. Transmitting unit 12 includes a modulator 16 coupled to receive a transmit baseband information signal 18 from a signal source (not shown in FIG. 1). In one representative embodiment, the signal source may include, for example, a microphone for converting sound waves into electronic signals and sampling and analog-to-digital converter electronics for sampling and converting the electronic signals into digital signals representative of the sound waves. In other embodiments, the signal source may include any suitable device for producing digital data signals for communication over channel 42, such as, but not limited to, a keyboard, a digital voice encoder, a mouse or other user input device, a sensor, monitor or testing apparatus, or the like.

Modulator 16 provides a transmit IF information signal 32 as an output to a transmitter 20. A transmit RF information signal 26 is produced by transmitter 20 for transmission from an antenna 22. Receiving unit 14 includes a receiver 24 coupled to an antenna 22 to process a receive RF information signal 44. Receiver 24 provides a modulated receive IF information signal 34 to a demodulator 28, which demodulates receive IF information signal 34 and generates receive baseband information signals 46.

The demodulated receive baseband information signals 46 from demodulator 28 may be provided to signal processing electronics, sound producing electronics or the like, depending upon the nature of use of the transceiver 10. The transmitting and receiving units 12 and 14 include further components, power supplies, and the like, well known in the art for effecting transmission and reception of signals and for carrying out other functions specific to the nature and application of use of the transceiver 10.

In preferred transceiver embodiments, such as cellular telephone embodiments or cordless telephone embodiments, each transmitting unit 12 and receiving unit 14 is configured to function as both a transmitting unit and a receiving unit. In one system embodiment, transmitting unit 12 and receiving unit 14 transmit and receive signals directly therebetween. In other system embodiments, transmitting unit 12 and receiving unit 14 communicate through one or more additional transceiver stations 30 (such as repeaters, base or cell stations, or the like).

Figure 2:
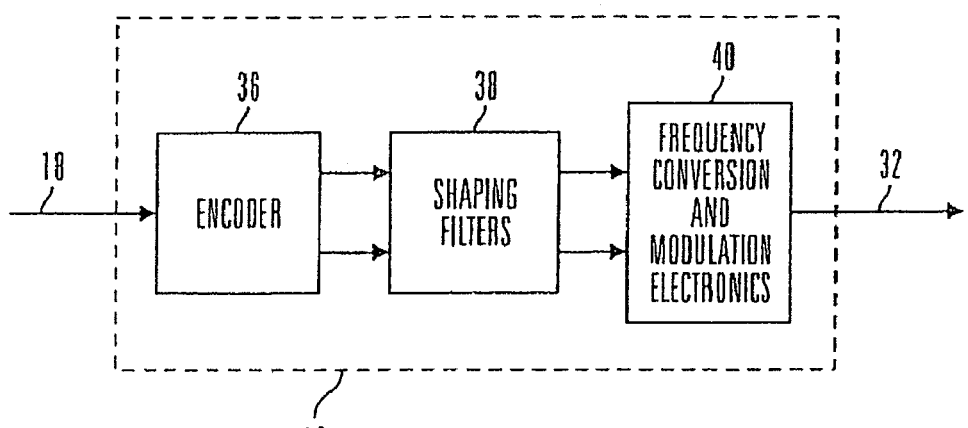
FIG. 2 is a block diagram illustrating an embodiment of the modulator of FIG. 1.

As illustrated in the modulator 16 of FIG. 2, in digital cellular telephone or cordless telephone system embodiments transmit baseband information signal 18 provides sampled voice (or sound) signals in the form of baseband I and Q channel signals to an encoder 36. In one preferred cellular telephone embodiment, encoder 36 comprises a Phase Shift Key (PSK) encoder, such as, but not limited to, a π/4-shift Quadrature Phase Shift Key (QPSK) mapper with differential encoder (e.g., a π/4 Differential Quadrature Phase Shift Key (DQPSK)), and shaping filters 38 comprise pulse shaping filters for smoothing the encoder output signal. An example of a π/4 DQPSK and pulse shaping electronics is described in the article titled: "π/4-shift QPSK Digital Modulator LSIC for Personal Communication Terminals," by Tetsu Sakata, Kazuhiko Seki, Shuji Kubota and Shuzo Kato, Proc, 5th IEEE International Symposium on Personal, Indoor and Mobile Radio Communications, 1994 (incorporated herein by reference). Other embodiments may employ other suitable encoding schemes, including but not limited to Amplitude Shift Keying (AMFSK) and Frequency Shift Keying (FSK) schemes.

I and Q outputs of the encoder pass through shaping filters 38 and then to frequency conversion and modulation electronics 40, the output of which comprises a transmit IF information signal 32. Transmit IF information signal 32 is then forwarded to transmitter 20 as shown in FIG. 1, which provides the transmit RF information signal 26 to the antenna 22 for transmission.

Figure 3:
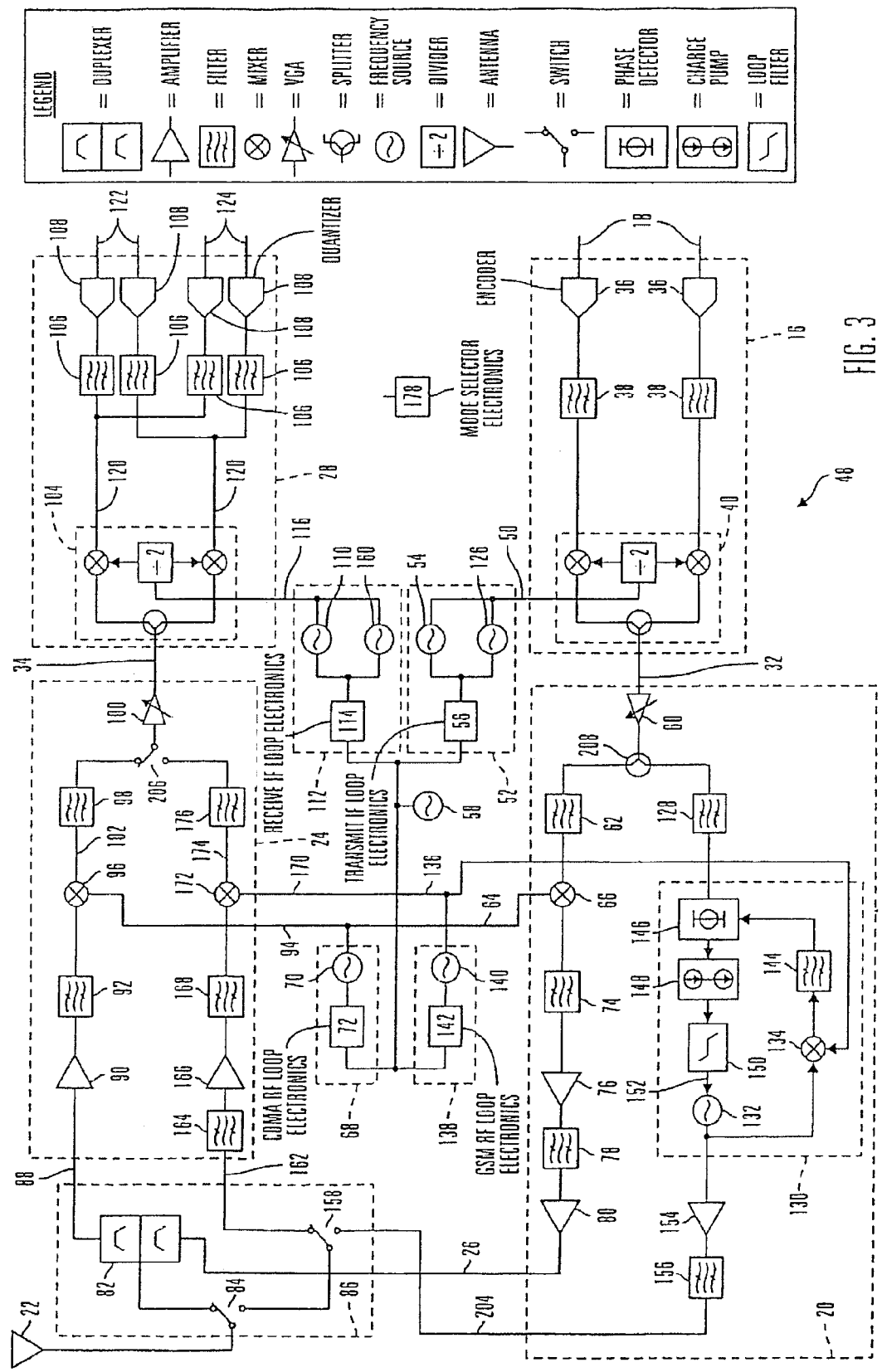
FIG. 3 is a block diagram illustrating an embodiment of a shared functional block CDMA-1900 and GSM-900 communication transceiver.

A shared functional block CDMA-1900 and GSM-900 communication transceiver 48 according to an embodiment of the shared functional block multi-mode multi-band transceiver is illustrated in FIG. 3. The transceiver 48 includes a modulator 16 as described above with reference to FIG. 2. In the transmit path, frequency conversion and modulation electronics 40 receive the I and Q outputs of shaping filters 38 and modulate a transmit IF LO 50 with the I and Q outputs to produce a transmit IF information signal 32 at an IF carrier frequency. Transmit IF LO 50 is generated by a transmit IF LO frequency generator 52 comprising a CDMA transmit IF LO frequency source 54 phase-locked to a reference source 58 by transmit IF LO loop electronics 56. In preferred embodiments of the shared functional block multi-mode multi-band transceiver, CDMA transmit IF LO frequency source 54 is a voltage controlled oscillator (VCO). However, in alternative embodiments of the shared functional block multi-mode multi-band transceiver, CDMA transmit IF LO frequency source 54 may be any adjustable frequency source.

Transmit IF information signal 32 is then amplified by a transmit IF variable gain amplifier (VGA) 60 within transmitter 20, which adjusts its gain based on commands received from the base station. It should be noted that although a variable gain amplifier is not required for GSM, power control is critical in CDMA, and thus because transmit IF VGA 60 is shared between the CDMA and GSM receive paths, transmit IF VGA 60 is provided variable gain capability to meet the power control requirements of CDMA.

The output of transmit IF VGA 60 is split by first transmit IF power splitter 208, and in the CDMA-1900 transmit path is then filtered by CDMA transmit IF filter 62, which filters out noise generated by the transmit IF VGA 60 in the receive band to meet receive band noise floor requirements. CDMA transmit IF filter 62 has a center frequency approximately equivalent to the IF carrier frequency and a bandwidth sufficient to pass the modulated and amplified transmit IF information signal with minimal distortion. CDMA has a modulation bandwidth of 1.25 MHz, thus the bandwidth of CDMA transmit IF filter 62 should be at least 1.25 MHz. In preferred embodiments, the bandwidth of CDMA transmit IF filter 62 is about 5 MHz. The modulated, amplified, and filtered transmit IF information signal is then mixed with a CDMA transmit RF LO 64 in CDMA transmit upconverter mixer 66. In preferred embodiments, CDMA transmit upconverter mixer 66 generates the difference between the output of CDMA transmit IF filter 62 and CDMA transmit RF LO 64.

In embodiments of the shared functional block multi-mode multi-band transceiver, CDMA transmit RF LO 64 is generated by a CDMA RF LO frequency generator 68 containing a CDMA RF LO frequency source 70 phase-locked to reference source 58 by CDMA RF LO loop electronics 72. In preferred embodiments, CDMA RF LO frequency source 70 comprises a VCO. However, in alternative embodiments, CDMA RF LO frequency source 70 may be any adjustable frequency source.

The output of CDMA transmit upconverter mixer 66 is filtered by first CDMA transmit RF filter 74 which, in the CDMA-1900 example of FIG. 3, has a passband encompassing the CDMA-1900 transmit band of about 1850–1910 MHz to remove spurious frequencies generated by CDMA transmit upconverter mixer 66. The output of first CDMA transmit RF filter 74 is then amplified by CDMA transmit RF driver amplifier 76. The output of CDMA transmit RF driver amplifier 76 is then filtered by second CDMA transmit RF filter 78, which in the CDMA-1900 example of FIG. 3 has a passband encompassing the CDMA-1900 transmit band of about 1850–1910 MHz to filter out noise in the CDMA-1900 receive band generated by CDMA transmit RF driver amplifier 76. The output of second CDMA transmit RF filter 78 is then amplified by CDMA transmit RF power amplifier 80 to generate CDMA transmit RF information signal 26 at a level sufficient to meet output power requirements at antenna 22. CDMA transmit RF information signal 26 is then filtered by duplexer 82, which in the CDMA-1900 example of FIG. 3 has a transmit passband encompassing the CDMA-1900 transmit band of about 1850–1910 MHz to filter out-of-band noise generated by CDMA transmit RF power amplifier 80. The output of duplexer 82 then passes through mode select switch 84 within antenna coupling electronics 86 before being transmitted by antenna 22. In alternative embodiments of the shared functional block multi-mode multi-band transceiver, mode select switch 84 may be an RF switch, a resistor combiner, or a duplexer.

In the CDMA-1900 receive path, signals from antenna 22 enter antenna coupling electronics 86, where they pass through mode select switch 84 and are filtered by duplexer 82 having a receive passband approximately equivalent to the CDMA-1900 receive band of about 1930–1990 MHz for passing only CDMA-1900 receive band signals. The output of duplexer 82 is CDMA receive RF information signal 88.

CDMA receive RF information signal 88 is then amplified by a CDMA receive RF Low-Noise Amplifier (LNA) 90. The output of CDMA receive RF LNA 90 is then filtered by a CDMA receive RF image reject filter 92. CDMA receive RF image reject filter 92 is a bandpass filter with a passband approximately equivalent to the CDMA-1900 receive band of about 1930–1990 MHz to filter out image noise generated by CDMA receive RF LNA 90 capable of mixing with CDMA receive RF LO 94 in CDMA receive downconverter mixer 96 and producing unwanted signals in the IF band. In preferred embodiments of the shared functional block multi-mode multi-band transceiver, CDMA receive RF LO 94 is generated by CDMA RF LO frequency generator 68, and CDMA receive downconverter mixer 96 generates the difference between the output of CDMA receive RF image reject filter 92 and CDMA receive RF LO 94, designated herein as CDMA receive IF information signal 102. It should be noted that in alternative embodiments of the shared functional block multi-mode multi-band transceiver, active image cancellation such as an image reject mixer may be employed, eliminating the need for CDMA receive RF image reject filter 92.

CDMA receive IF information signal 102 then passes through a CDMA receive IF filter 98 with a bandwidth approximately equivalent to the CDMA modulation bandwidth of 1.25 MHz to remove spurious frequencies generated by CDMA receive downconverter mixer 96. The output of CDMA receive IF filter 98 is then coupled to receive IF VGA 100 through a first receive IF switch 206. Receive IF VGA 100 provides variable gain control by adjusting its gain based on commands received from the base station. The output of receive IF VGA 100 is receive IF information signal 34.

Receive IF information signal 34 is mixed with receive IF LO 116 and demodulated by frequency conversion and demodulation electronics 104 within demodulator 28. In embodiments of the shared functional block multi-mode multi-band transceiver, receive IF LO 116 is generated by a receive IF LO frequency generator 112 comprising a CDMA receive IF LO frequency source 110 phase-locked to reference source 58 by receive IF LO loop electronics 114. In preferred embodiments, CDMA receive IF LO frequency source 110 is a VCO. However, in alternative embodiments, CDMA receive IF LO frequency source 110 may be any adjustable frequency source.

Frequency conversion and demodulation electronics 104 produce baseband information signals 120, characterized herein as either a DC or a "near DC" IF (for example, a center frequency above about 1 MHz). In the CDMA-1900 receive path, these baseband information signals 120 are filtered by CDMA baseband filters 106 to remove spurious frequencies generated by frequency conversion and demodulation electronics 104. CDMA baseband filters 106 have a bandwidth of about 1.25 MHz to accommodate the modulation bandwidth of CDMA receive baseband signals, and may be low pass filters if the receive baseband signals are DC, or bandpass filters if the receive baseband signals are near DC. The filtered and demodulated receive baseband signals are then processed by quantizers 108, which generate CDMA I and Q outputs 122. In preferred embodiments, quantizers 108 are analog-to-digital converters (ADCs).

The GSM-900 transmit path shares modulator 16 and transmit IF VGA 60 with the CDMA-1900 transmit path. However, transmit IF LO 50, used by frequency conversion and modulation electronics 40 to generate transmit IF information signal 32, is produced by GSM transmit IF LO frequency source 126 within transmit IF LO frequency generator 52. GSM transmit IF LO frequency source 126 is coupled in parallel with CDMA transmit IF LO frequency source 54 and is phase locked to reference source 58 by transmit IF LO loop electronics 56.

The GSM-900 transmit path diverges from the CDMA-1900 transmit path at the output of transmit IF VGA 60, where the output of transmit IF VGA 60 is split by first transmit IF power splitter 208 and filtered by GSM transmit IF filter 128, which filters out noise generated by the transmit IF VGA 60 in the GSM receive band to meet receive band noise floor requirements. GSM transmit IF filter 128 has a center frequency approximately equivalent to the IF carrier frequency and a bandwidth sufficient to pass the modulated and amplified transmit IF information signal with minimal distortion. GSM has a modulation bandwidth of 200 kHz, thus the bandwidth of GSM transmit IF filter 128 should be at least 200 kHz. In preferred embodiments, the bandwidth of GSM transmit IF filter 128 is about 1 MHz.

In preferred embodiments of the shared functional block multi-mode multi-band transceiver, the output of GSM transmit IF filter 128 is then upconverted by a translation loop 130. In further preferred embodiments, translation loop 130 includes a GSM VCO 132 coupled to a translation loop mixer 134 and phase-locked to a GSM transmit RF LO 136 for generating GSM RF carrier frequencies. Translation loop 130 acts like a tracking filter with a center frequency at the frequency of the GSM VCO 132.

In embodiments of the shared functional block multi-mode multi-band transceiver, GSM transmit RF LO 136 is generated by a GSM RF LO frequency generator 138 comprising a GSM RF LO frequency source 140 phase-locked to reference source 58 by GSM RF LO loop electronics 142. In preferred embodiments, GSM RF LO frequency source 140 comprises a VCO. However, in alternative embodiments, GSM RF LO frequency source 140 may be any adjustable frequency source.

In preferred embodiments, translation loop mixer 134 generates the difference between GSM VCO 132 and GSM transmit RF LO 136. Translation loop 130 further includes a feedback filter 144 for filtering the output of translation loop mixer 134 to remove mixer noise, a phase detector 146 for determining the phase difference between the output of feedback filter 144 and GSM transmit IF filter 128, a charge pump 148 for sourcing or sinking current as determined by the phase difference output of phase detector 146, and a loop filter 150 for integrating current pulses from charge pump 148 and providing a control voltage 152 to GSM VCO 132.

The modulated upconverted output of GSM VCO 132 is then amplified by GSM transmit RF power amplifier 154 to generate a GSM transmit RF information signal at a level sufficient to meet output power requirements at antenna 22. The output of GSM transmit RF power amplifier 154 is then filtered by GSM transmit RF filter 156, which in the GSM-900 example of FIG. 3 has a transmit passband encompassing the GSM-900 transmit band of about 890–915 MHz to filter out-of-band noise generated by GSM transmit RF power amplifier 154. The output of GSM transmit RF filter 156, identified herein as GSM transmit RF information signal 204, then passes through transmit/receive switch 158 within antenna coupling electronics 86 and mode select switch 84 before being transmitted by antenna 22. In alternative embodiments of the shared functional block multi-mode multi-band transceiver, transmit/receive switch 158 may be an RF switch, a resistor combiner, or a duplexer.

It should be noted that because translation loop 130 in the GSM transmit path generates a relatively clean (minimal out-of-band noise) signal from GSM VCO 132, there is no need for a high-insertion loss duplexer, as used in the CDMA transmit path. The elimination of the duplexer enables a lower power GSM transmit RF power amplifier to be used, resulting in substantial power savings in the communication transceiver. The CDMA transmit path cannot use a translation loop, however, because a translation loop cannot track the amplitude information present in a CDMA Offset QPSK (OQPSK) signal.

Notwithstanding the advantages of using a translation loop, in alternative embodiments of the shared functional block multi-mode multi-band transceiver, translation loop 130 may be replaced by an upconverter mixer as in the CDMA transmit path. In such embodiments, transmit/receive switch 158 may be replaced with a duplexer to filter out-of-band noise generated by GSM transmit RF power amplifier 154.

In the GSM-900 receive path, signals from antenna 22 enter antenna coupling electronics 86, where they pass through mode select switch 84 and transmit/receive switch 158. The output of transmit/receive switch 158 is GSM receive RF information signal 162, which is filtered by preselector filter 164 having a receive passband approximately equivalent to the GSM-900 receive band of about 935–960 MHz for passing only GSM-900 receive band signals.

The output of preselector filter 164 is then amplified by a GSM receive RF LNA 166. The output of GSM receive RF LNA 166 is then filtered by a GSM receive RF image reject filter 168. GSM receive RF image reject filter 168 is a bandpass filter with a bandwidth approximately equivalent to the GSM-900 receive band of about 935–960 MHz to filter out image noise generated by GSM receive RF LNA 166 capable of mixing with GSM receive RF LO 170 in GSM receive downconverter mixer 172 and producing unwanted signals in the IF band. In preferred embodiments of the shared functional block multi-mode multi-band transceiver, GSM receive RF LO 170 is generated by GSM RF LO frequency generator 138, and GSM receive downconverter mixer 172 generates the difference between the output of GSM receive RF image reject filter 168 and GSM receive RF LO 170, designated herein as GSM receive IF information signal 174. It should be noted that in alternative embodiments of the shared functional block multi-mode multi-band transceiver, active image cancellation such as an image reject mixer may be employed, eliminating the need for GSM receive RF image reject filter 168.

GSM receive IF information signal 174 then passes through a GSM receive IF filter 176 with a bandwidth approximately equivalent to the GSM modulation bandwidth of 200 kHz to remove spurious frequencies generated by GSM receive downconverter mixer 172.

The output of GSM receive IF filter 176 is then coupled to receive IF VGA 100 by first receive IF switch 206, where it is amplified by receive IF VGA 100. However, as previously noted, the output of CDMA receive IF filter 98 is also coupled to receive IF VGA 100 by first receive IF switch 206. Thus, the gain, Noise Figure (NF), and Third-Order Intermodulation-Intercept Point (IIP3) of the shared receive IF VGA 100 should be chosen to satisfy the requirements of both the CDMA-1900 and GSM-900 receive paths. In alternative embodiments of the shared functional block multi-mode multi-band transceiver, first receive IF switch 206 may comprise switchable high off-state impedance buffer amplifiers or an RF switch.

Receive IF information signal 34 is then mixed with receive IF LO 116 and demodulated by frequency conversion and demodulation electronics 104 within demodulator 28. Because the IF frequencies of CDMA-1900 and GSM-900 may be different, receive IF LO 116 as used for GSM demodulation is not generated by CDMA receive IF LO frequency source 110. Instead, receive IF LO 116 as used for GSM demodulation is generated by a GSM receive IF LO frequency source 160 in parallel with CDMA receive IF LO frequency source 110 and phase-locked to reference source 58 by receive IF LO loop electronics 114. In preferred embodiments of the shared functional block multi-mode multi-band transceiver, GSM receive IF LO frequency source 160 is a VCO. However, in alternative embodiments, GSM receive IF LO frequency source 160 may be any adjustable frequency source.

Frequency conversion and demodulation electronics 104 produce baseband information signals 120. In the GSM-900 receive path, these baseband information signals 120 are filtered by GSM baseband filters 118 to remove spurious frequencies generated by frequency conversion and demodulation electronics 104. GSM baseband filters 118 have a bandwidth of about 200 kHz to accommodate the modulation bandwidth of GSM receive baseband signals, and may be low pass filters if the receive baseband signals are DC, or bandpass filters if the receive baseband signals are near DC. The filtered and demodulated receive baseband signals are then processed by quantizers 108, which generate GSM I and Q outputs 124. In preferred embodiments, quantizers 108 are analog-to-digital converters (ADCs).

In embodiments of the shared functional block multi-mode multi-band transceiver, mode selector electronics 178 configures the CDMA-1900 and GSM-900 communication transceiver 48 for either CDMA or GSM operation. In preferred embodiments of the shared functional block multi-mode multi-band transceiver, mode selector electronics 178 is a processing device automatically configurable by remote commands or signal strength measurements received from base stations. In alternative embodiments, mode selector electronics 178 may comprise a factory-programmable logic device or user-configurable logic. When mode selector electronics 178 is configured for CDMA operation, mode select switch 84 is configured to couple duplexer 82 to antenna 22, receive IF LO frequency generator 112 is configured to couple CDMA receive IF LO frequency source 110 to frequency conversion and demodulation electronics 104, and transmit IF LO frequency generator 52 is configured to couple CDMA transmit IF LO frequency source 54 to frequency conversion and modulation electronics 40. When mode selector electronics 178 is configured for GSM operation, mode select switch 84 is configured to couple transmit/receive switch 158 to antenna 22, receive IF LO frequency generator 112 is configured to couple GSM receive IF LO frequency source 160 to frequency conversion and demodulation electronics 104, and transmit IF LO frequency generator 52 is configured to couple GSM transmit IF LO frequency source 126 to frequency conversion and modulation electronics 40.

Embodiments of the shared functional block multi-mode multi-band transceiver described above employ a separate CDMA transmit IF LO frequency source 54 and GSM transmit IF LO frequency source 126. However, in alternative embodiments of the shared functional block multi-mode multi-band transceiver, CDMA transmit IF LO frequency source 54 and GSM transmit IF LO frequency source 126 may comprise a single tunable transmit IF LO frequency source. Similarly, embodiments of the shared functional block multi-mode multi-band transceiver described above disclose a separate CDMA receive IF LO frequency source 110 and GSM receive IF LO frequency source 160. However, in alternative embodiments of the shared functional block multi-mode multi-band transceiver, CDMA receive IF LO frequency source 110 and GSM receive IF LO frequency source 160 may comprise a single tunable receive IF LO frequency source.

Furthermore, embodiments of the shared functional block multi-mode multi-band transceiver described above employ a single CDMA RF LO frequency source 70. However, in alternative embodiments of the shared functional block multi-mode multi-band transceiver, CDMA RF LO frequency source 70 may comprise a separate CDMA receive RF LO frequency source and a separate CDMA transmit RF LO frequency source. Similarly, embodiments of the shared functional block multi-mode multi-band transceiver described above disclose a single GSM RF LO frequency source 140. However, in alternative embodiments of the shared functional block multi-mode multi-band transceiver, GSM RF LO frequency source 140 may comprise a separate GSM receive RF LO frequency source and a separate GSM transmit RF LO frequency source.

Figure 4:
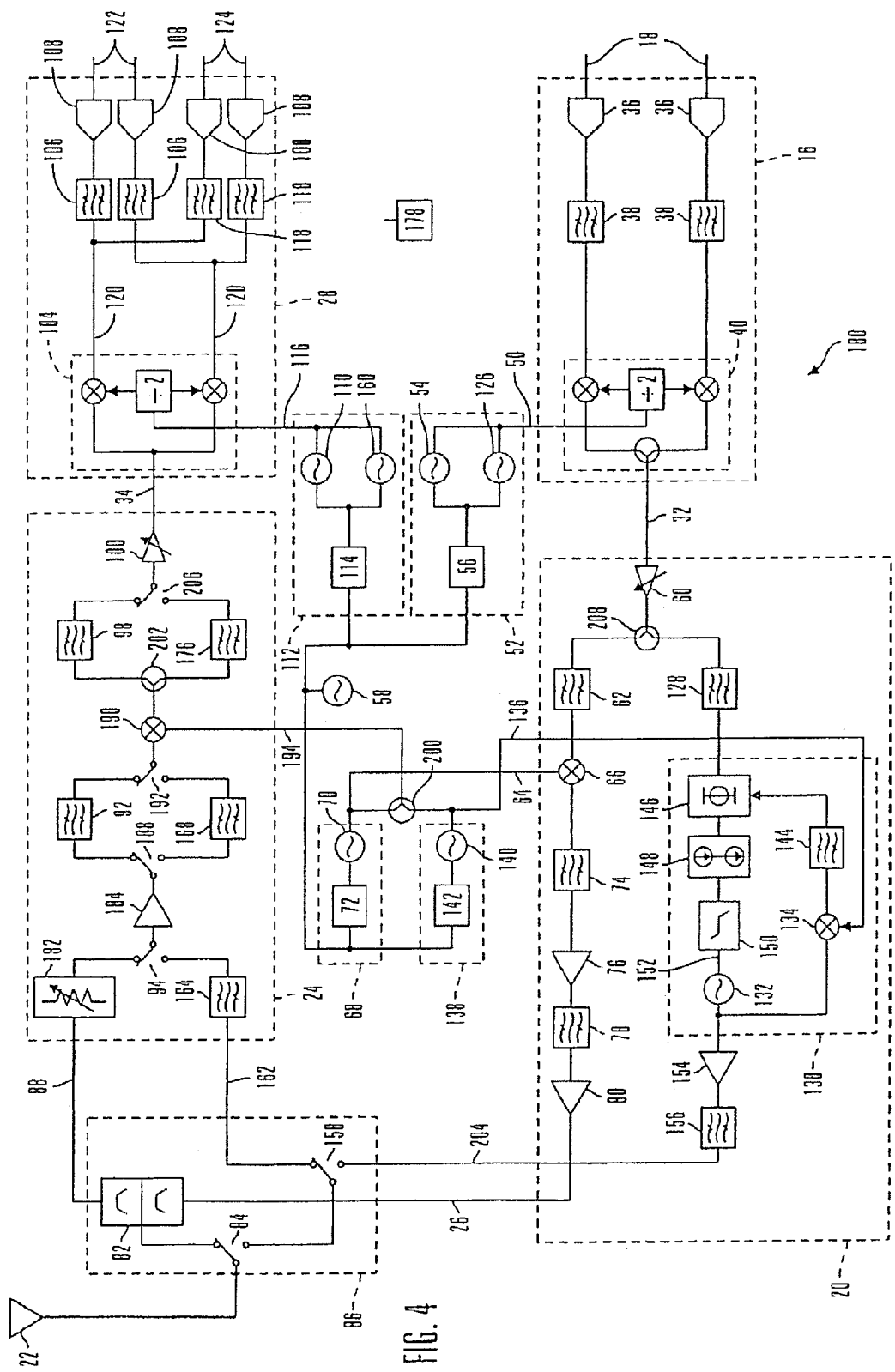
FIG. 4 is a block diagram illustrating an embodiment of a shared functional block CDMA-900 and GSM-900 communication transceiver.

A shared functional block CDMA-900 and GSM-900 communication transceiver 180 according to an embodiment of the shared functional block multi-mode multi-band transceiver is illustrated in FIG. 4. The architecture and operation of CDMA-900 and GSM-900 communication transceiver 180 in FIG. 4 is similar to that of CDMA-1900 and GSM-900 communication transceiver 48 in FIG. 3, except as noted below. Referring to FIG. 4, in the CDMA receive path, CDMA receive RF information signal 88 passes through a variable gain attenuator 182 in preferred embodiments of the shared functional block multi-mode multi-band transceiver. Unlike the CDMA-1900 communication standard, which only specifies one composite signal level for purposes of test, the CDMA-900 communication standard specifies three different composite signals for purposes of test, and thus variable gain attenuator 182 selectively attenuates the received signal to meet CDMA communication standard cellular receive band intermodulation requirements. However, in alternative embodiments, attenuation control may be achieved by selectively bypassing common receive RF LNA 184, or a variable gain common receive RF LNA 184 may be employed instead of variable gain attenuator 182.

The output of variable gain attenuator 182 in the CDMA receive path and preselector filter 164 in the GSM receive path are coupled by a first receive RF switch 186, which in alternative embodiments of the shared functional block multi-mode multi-band transceiver, may be an RF switch, high off-state impedance amplifiers or transmission gates, a resistor combiner, or a duplexer. First receive RF switch 186 allows common receive RF LNA 184 to be used in both the CDMA and GSM receive paths. The use of a single, limited frequency range LNA is possible in CDMA-900 and GSM-900 communication transceiver 180 because the frequency bands of CDMA-900 and GSM-900 are similar. Because common receive RF LNA 184 is shared between the CDMA-900 and GSM-900 receive paths, the gain, NF, and IIP3 of common receive RF LNA 184 should be chosen to satisfy the requirements of both the CDMA-900 and GSM-900 receive paths. The output of common receive RF LNA 184 is then coupled to either CDMA receive RF image reject filter 92 or GSM receive RF image reject filter 168 by second receive RF switch 188. In alternative embodiments of the shared functional block multi-mode multi-band transceiver, second receive RF switch 188 may be an RF switch, high off-state impedance amplifiers or transmission gates, a resistor combiner, or a duplexer.

The outputs of CDMA receive RF image reject filter 92 and GSM receive RF image reject filter 168 are then coupled to common receive downconverter mixer 190 by third receive RF switch 192. Third receive RF switch 192 allows common receive downconverter mixer 190 to be used in both the CDMA and GSM receive paths, which is possible because of the small frequency difference between the receive bands of CDMA-900 and GSM-900. Because common receive downconverter mixer 190 is shared between the CDMA-900 and GSM-900 receive paths, the gain, NF, and IIP3 of common receive downconverter mixer 190 should be chosen to satisfy the requirements of both the CDMA-900 and GSM-900 receive paths. In alternative embodiments of the shared functional block multi-mode multi-band transceiver, third receive RF switch 192 may be an RF switch, high off-state impedance amplifiers or transmission gates, a resistor combiner, or a duplexer. Downconverter mixer 190 mixes either the output of CDMA receive RF image reject filter 92 or the output of GSM receive RF image reject filter 168 with a common receive RFLO 194.

Common receive RF LO 194 is produced by coupling CDMA RF LO frequency source 70 and GSM RF LO frequency source 140 with a common receive RF LO power combiner 200. The output of common receive RF LO power combiner 200 is approximately equivalent to either the output of CDMA RF LO frequency source 70 or the output of GSM RF LO frequency source 140, because mode selector electronics 178 enables either CDMA RF LO frequency source 70 or GSM RF LO frequency source 140, but not both.

The output of downconverter mixer 190 is coupled to CDMA receive IF filter 98 and GSM receive IF filter 176 through common receive IF power splitter 202, which distributes a signal approximately equal in amplitude and phase to CDMA receive IF filter 98 and GSM receive IF filter 176. In preferred embodiments, CDMA receive IF filter 98 and GSM receive IF filter 176 are surface acoustic wave (SAW) filters, because SAW filters act as high impedance elements for out-of-band frequencies. The outputs of CDMA receive IF filter 98 and GSM receive IF filter 176 are coupled to receive IF VGA 100 by first receive IF switch 206. Because receive IF VGA 100 is shared between the CDMA-900 and GSM-900 receive paths, the gain, NF, and IIP3 of receive IF VGA 100 should be chosen to satisfy the requirements of both the CDMA-900 and GSM-900 receive paths.

When mode selector electronics 178 is configured for CDMA operation, first receive RF switch 186 is configured to couple variable gain attenuator 182 to common receive RF LNA 184, second receive RF switch 188 is configured to couple common receive RF LNA 184 to CDMA receive RF image reject filter 92, and third receive RF switch 192 is configured to couple CDMA receive RF image reject filter 92 to common receive downconverter mixer 190. When mode selector electronics 178 is configured for GSM operation, first receive RF switch 186 is configured to couple preselector filter 164 to common receive RF LNA 184, second receive RF switch 188 is configured to couple common receive RF LNA 184 to GSM receive RF image reject filter 168, and third receive RF switch 192 is configured to couple GSM receive RF image reject filter 168 to common receive downconverter mixer 190.

It should also be noted that the RF filters in the CDMA transmit and receive paths of CDMA-900 and GSM-900 communication transceiver 180 have different passbands as compared to those in FIG. 3. First CDMA transmit RF filter 74, second CDMA transmit RF filter 78, and duplexer 82 have transmit passbands encompassing the CDMA-900 transmit band of about 824–849 MHz. Duplexer 82 and CDMA receive RF image reject filter 92 have receive passbands approximately equivalent to the CDMA-900 receive band of about 869–894 MHz.

Figure 5:
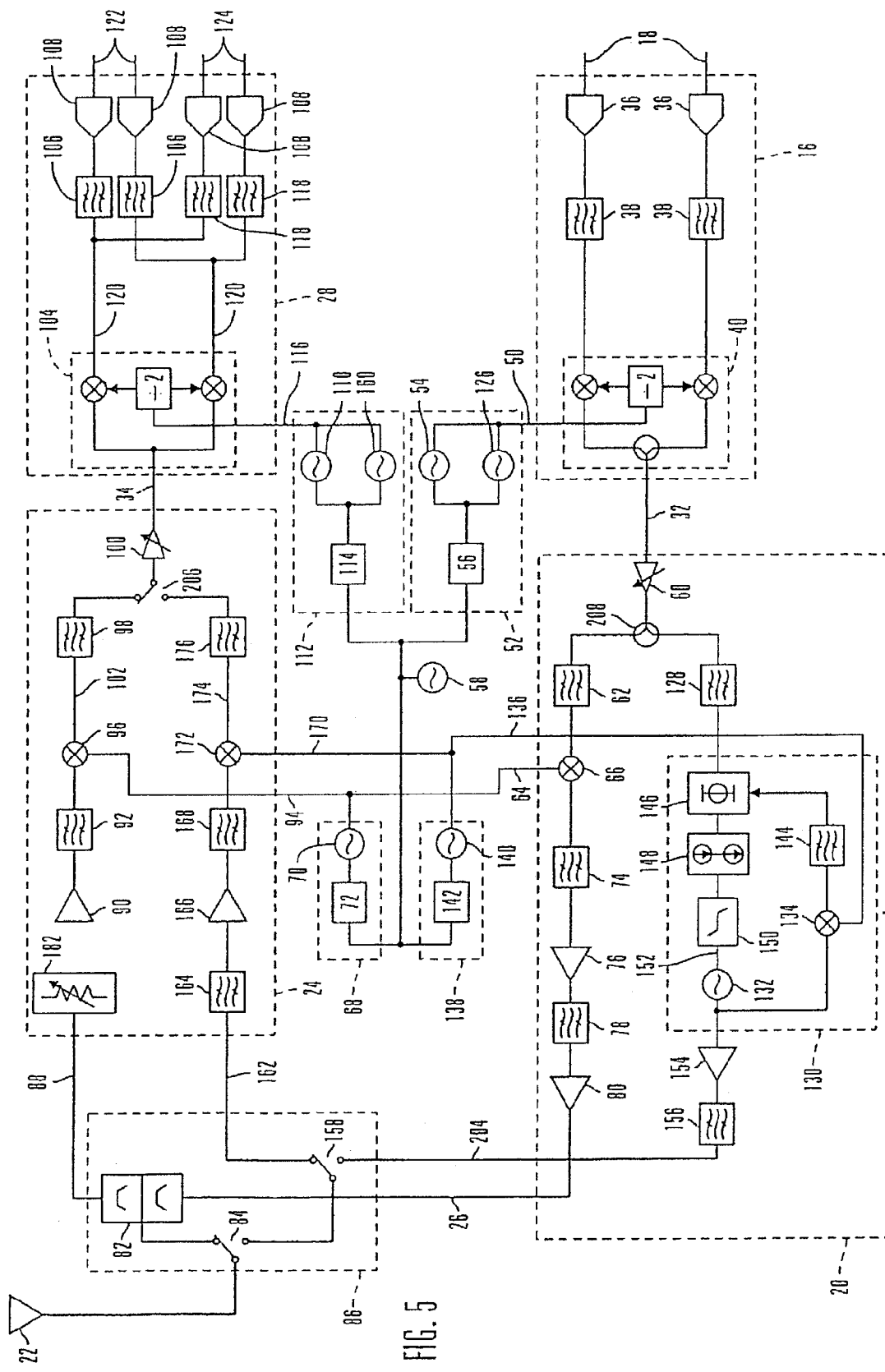
FIG. 5 is a block diagram illustrating an embodiment of a shared functional block CDMA-900 and PCS communication transceiver.

A shared functional block CDMA-900 and PCS communication transceiver 196 according to an embodiment of the shared functional block multi-mode multi-band transceiver is illustrated in FIG. 5. It should be noted that a similar architecture is applicable to a shared functional block CDMA-900 and DCS communication transceiver. The architecture and operation of CDMA-900 and PCS communication transceiver 196 in FIG. 5 is similar to that of CDMA-1900 and GSM-900 communication transceiver 48 in FIG. 3, except that in the CDMA receive path, variable gain attenuator 182 is coupled between duplexer 82 and CDMA receive RF LNA 90. Note that because receive IF VGA 100 is shared by the CDMA-900 and PCS receive paths, the gain, NF, and IIP3 of the shared receive IF VGA 100 should be chosen to satisfy the requirements of both the CDMA-900 and PCS receive paths.

It should also be noted that the RF filters in the CDMA and GSM transmit and receive paths of CDMA-900 and PCS communication transceiver 196 have different passbands as compared to those in FIG. 3. First CDMA transmit RF filter 74, second CDMA transmit RF filter 78, and duplexer 82 have transmit passbands encompassing the CDMA-900 transmit band of about 824–849 MHz. Duplexer 82 and CDMA receive RF image reject filter 92 have receive passbands approximately equivalent to the CDMA-900 receive band of about 869–894 MHz. GSM transmit RF filter 156 has a transmit passband encompassing the PCS transmit band of about 1850–1910 MHz. Preselector filter 164 and GSM receive RF image reject filter 168 have receive passbands approximately equivalent to the PCS receive band of about 1930–1990 MHz.

Furthermore, in alternative embodiments of the shared functional block multimode multi-band transceiver wherein the DCS communication standard replaces the PCS communication standard in FIG. 5, GSM transmit RF filter 156 has a transmit passband encompassing the DCS transmit band of about 1710–1785 MHz, and preselector filter 164 and GSM receive RF image reject filter 168 have receive passbands approximately equivalent to the DCS receive band of about 1805–1880 MHz.

Figure 6:
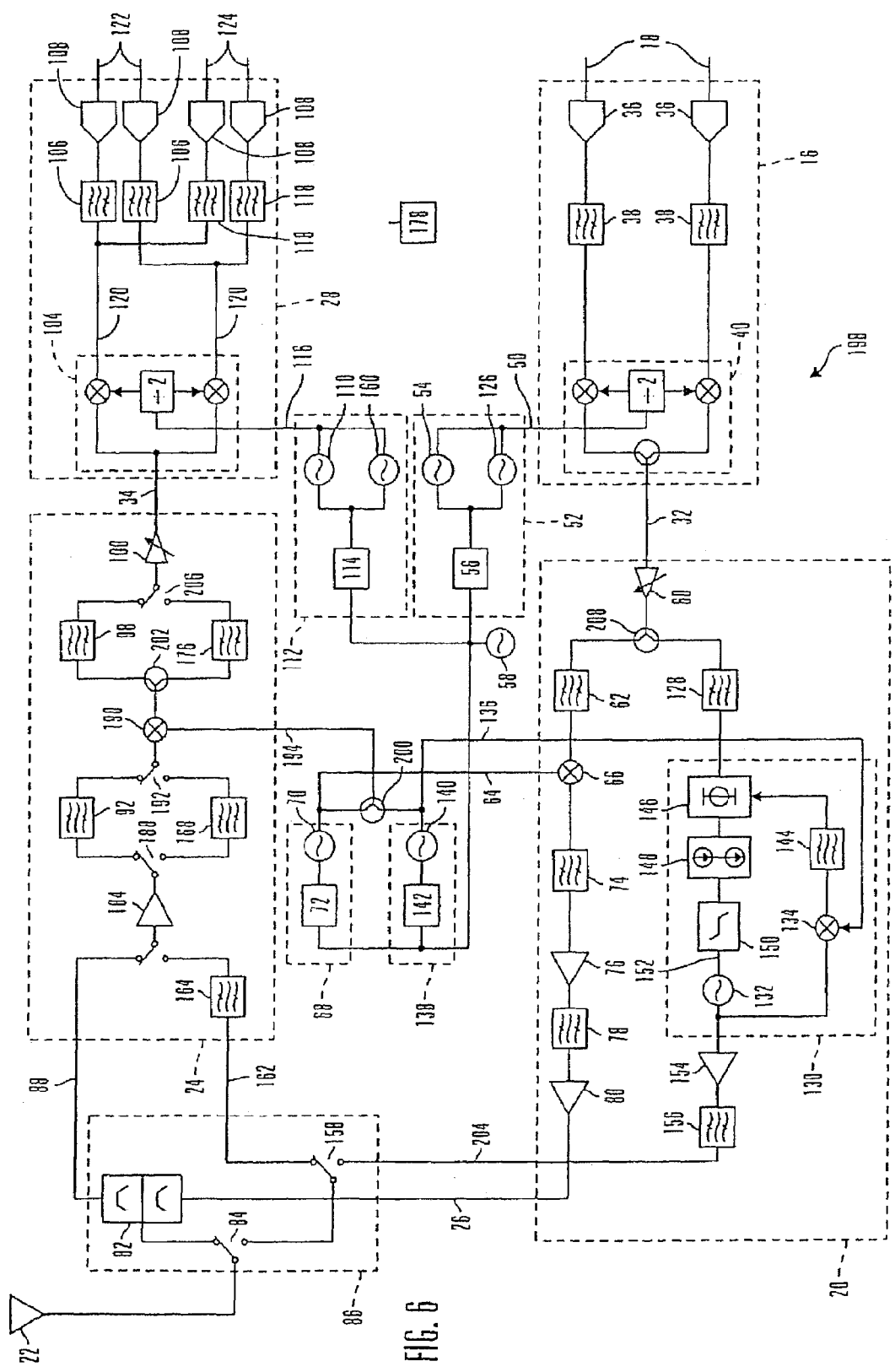
FIG. 6 is a block diagram illustrating an embodiment of a shared functional block CDMA-1900 and PCS communication transceiver.

A shared functional block CDMA-1900 and PCS communication transceiver 198 according to an embodiment of the shared functional block multi-mode multi-band transceiver is illustrated in FIG. 6. It should be noted that a similar architecture is applicable to a shared functional block CDMA-1900 and DCS communication transceiver. The architecture and operation of CDMA-1900 and PCS communication transceiver 198 in FIG. 6 is similar to that of CDMA-1900 and GSM-900 communication transceiver 48 in FIG. 3, except that the output of duplexer 82 in the CDMA receive path and preselector filter 164 in the GSM receive path are coupled by a first receive RF switch 186, which in alternative embodiments of the present invention, may be an RF switch, high off-state impedance amplifiers or transmission gates, a resistor combiner, or a duplexer. First receive RF switch 186 allows common receive RF LNA 184 to be used in both the CDMA and GSM receive paths. The use of a single, limited frequency range LNA is possible in CDMA-1900 and PCS communication transceiver 198 because the frequency bands of CDMA-1900 and PCS are similar. Because common receive RF LNA 184 is shared between the CDMA-1900 and PCS receive paths, the gain, NF, and IIP3 of common receive RF LNA 184 should be chosen to satisfy the requirements of both the CDMA-1900 and PCS receive paths. The output of common receive RF LNA 184 is then coupled to either CDMA receive RF image reject filter 92 or GSM receive RF image reject filter 168 by second receive RF switch 188. In alternative embodiments of the shared functional block multi-mode multi-band transceiver, second receive RF switch 188 may be an RF switch, high off-state impedance amplifiers or transmission gates, a resistor combiner, or a duplexer.

The outputs of CDMA receive RF image reject filter 92 and GSM receive RF image reject filter 168 are then coupled to common receive downconverter mixer 190 by third receive RF switch 192. Third receive RF switch 192 allows common receive downconverter mixer 190 to be used in both the CDMA and GSM receive paths, which is possible because of the small frequency difference between the receive bands of CDMA-1900 and PCS. Because common receive downconverter mixer 190 is shared between the CDMA-1900 and PCS receive paths, the gain, NF, and IIP3 of common receive downconverter mixer 190 should be chosen to satisfy the requirements of both the CDMA-1900 and PCS receive paths. In alternative embodiments of the shared functional block multi-mode multi-band transceiver, third receive RF switch 192 may be an RF switch, high off-state impedance amplifiers or transmission gates, a resistor combiner, or a duplexer. Downconverter mixer 190 mixes either the output of CDMA receive RF image reject filter 92 or the output of GSM receive RF image reject filter 168 with a common receive RF LO 194.

Common receive RF LO 194 is produced by coupling CDMA RF LO frequency source 70 and GSM RF LO frequency source 140 with a common receive RF LO power combiner 200. The output of common receive RF LO power combiner 200 is approximately equivalent to either the output of CDMA RF LO frequency source 70 or the output of GSM RF LO frequency source 140, because mode selector electronics 178 enables either CDMA RF LO frequency source 70 or GSM RF LO frequency source 140, but not both.

The output of downconverter mixer 190 is coupled to CDMA receive IF filter 98 and GSM receive IF filter 176 through common receive IF power splitter 202, which distributes a signal approximately equal in amplitude and phase to CDMA receive IF filter 98 and GSM receive IF filter 176. In preferred embodiments, CDMA receive IF filter 98 and GSM receive IF filter 176 are surface acoustic wave (SAW) filters, because SAW filters act as high impedance elements for out-of-band frequencies. The outputs of CDMA receive IF filter 98 and GSM receive IF filter 176 are coupled to receive IF VGA 100 by first receive IF filter 206. Because receive IF VGA 100 is shared between the CDMA-1900 and PCS receive paths, the gain, NF, and IIP3 of receive IF VGA 100 should be chosen to satisfy the requirements of both the CDMA-1900 and PCS receive paths.

When mode selector electronics 178 is configured for CDMA operation, first receive RF switch 186 is configured to couple duplexer 82 to common receive RF LNA 184, second receive RF switch 188 is configured to couple common receive RF LNA 184 to CDMA receive RF image reject filter 92, and third receive RF switch 192 is configured to couple CDMA receive RF image reject filter 92 to common receive downconverter mixer 190. When mode selector electronics 178 is configured for GSM operation, first receive RF switch 186 is configured to couple preselector filter 164 to common receive RF LNA 184, second receive RF switch 188 is configured to couple common receive RF LNA 184 to GSM receive RF image reject filter 168, and third receive RF switch 192 is configured to couple GSM receive RF image reject filter 168 to common receive downconverter mixer 190.

It should also be noted that the RF filters in the GSM transmit and receive paths of CDMA-1900 and PCS communication transceiver 198 have different passbands as compared to those in FIG. 3. GSM transmit RF filter 156 has a transmit passband encompassing the PCS transmit band of about 1850–1910 MHz, and preselector filter 164 and GSM receive RF image reject filter 168 have receive passbands approximately equivalent to the PCS receive band of about 1930–1990 MHz.

Furthermore, in alternative embodiments of the shared functional block multi-mode multi-band transceiver wherein the DCS communication standard replaces the PCS communication standard in FIG. 6, GSM transmit RF filter 156 has a transmit passband encompassing the DCS transmit band of about 1710–1785 MHz, and preselector filter 164 and GSM receive RF image reject filter 168 have receive passbands approximately equivalent to the DCS receive band of about 1805–1880 MHz.

FIGS. 3–6 illustrate embodiments of the shared functional block multi-mode multi-band transceiver which utilize modulation to, and demodulation from, an IF frequency, in alternative embodiments direct conversion may be employed. In direct conversion, receive RF information signals are downconverted and demodulated directly to baseband, and baseband information signals are modulated and upconverted directly to transmit RF information signals.

FIGS. 7–11 illustrate embodiments of the shared functional block multi-mode multi-band transceiver which utilize a direct launch technique for GSM, WCDMA, and EDGE. Both EDGE and WCDMA use non constant envelope modulation techniques such as $3\pi/8$-PSK and complex QPSK. WCDMA systems use amplifiers with approximately 90 dB of dynamic range to meet open and closed loop power control requirements. GSM and EDGE systems use amplifiers with approximately 30–40 dB of dynamic range. In direct launch transmitters, the LO frequency is the same as the final RF frequency. To prevent carrier leakage from the VCO into the multiple transmit signal channels, the VCO can be operated at even integer multiples of the RF frequency (e.g., 2×, 4×).

Figure 7:
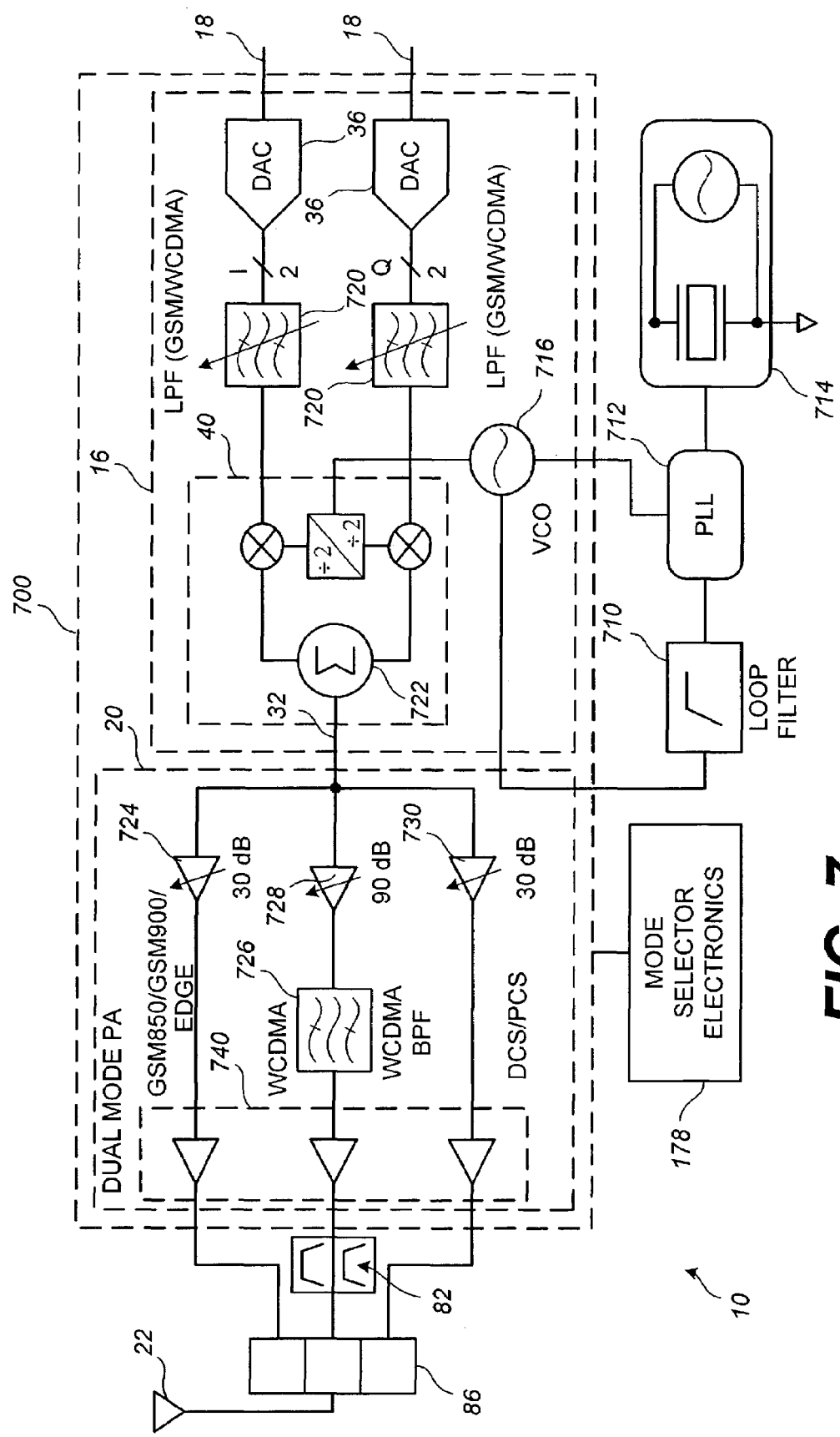
FIG. 7 is a block diagram illustrating an embodiment of a common transmitter architecture for a shared functional block GSM, DCS/PCS, and WCDMA communication transceiver.

FIG. 7 illustrates a first embodiment of a multi-mode transceiver 10 that uses a direct launch RF signal transmission technique to produce EDGE/GSM, WCDMA, and DCS/PCS compatible signal transmissions. As stated above, EDGE is a modification of GSM that uses similar signal transmission methodologies. Transceiver 10 includes antenna 22, switchplexer 86, duplexer 82, integrated transmitter 700 generally including elements depicted to be "on-chip" i.e., within an integrated circuit, and off-chip elements. Antenna 22 receives and is provided RF signals for transmission via switchplexer 86. Switchplexer 86 controllably routes both transmit to and receive signals from antenna 22 in response to a control signal supplied via mode selector electronics 178. When WCDMA signal transmissions are desired, duplexer 82 couples the integrated transmitter 700 to the switchplexer 86. Duplexer 82 is used to isolate the high and low frequency bands used by WCDMA communication signals.

Integrated transmitter 700 includes modulator 16 and transmitter portion 20. Modulator 16 is coupled to receive a transmit baseband information signal 18 from a signal source (not shown). Modulator 16 produces an analog signal in accordance with the select communication protocol (EDGE/GSM, WCDMA, or DCS/PCS, etc.) as directed by mode selector electronics 178. The signal source 18 is provided to modulator 16 as differential in-phase and quadrature signals (I and Q). The I and Q input signals are converted to analog representations of the digital I and Q signals in respective digital to analog converters (DAC) 36. The converted baseband signals are filtered via low-pass filters 720. Low-pass filters 720 are switched as desired to accommodate the different bandwidths of the various communication protocols (e.g., 100 kHz for GSM; 1.92 MHz for WCDMA). The filtered data signals are then forwarded to modulation electronics 40. Modulation electronics 40 receive the filtered baseband signals and upconvert the signals to the desired frequency for the select communication protocol. Modulation electronics 40 upconvert the filtered baseband signals under the control of VCO 716, loop filter 710, PLL 712, and VCTCXO 714. As illustrated in FIG. 7, modulation electronics 40 uses one or more dividers to control mixers to complete the frequency upconversion. The upconverted signals are then forwarded to summer 722 which forwards a combined RF output signal on output 32 to the transmitter portion 20.

Transmitter portion 20 includes multiple signal transmission paths. A first RF signal transmission path is configured with VGA 724 and is designated for EDGE/GSM. A second RF signal transmission path is configured with VGA 728 and bandpass filter 726 and is designated for WCDMA. A third RF signal transmission path is configured with VGA 730 and is designated for DCS/PCS. VGA 724 and VGA 730 designated for EDGE/GSM and DCS/PCS communication modes have a dynamic range of 30 dB. WCDMA power control requirements are met by cascading VGA 728 and power amplifier 740. VGA 728 has a dynamic range of 90 dB. In alternative embodiments, the WCDMA dynamic range of 90 dB can be met via various combinations of discrete amplifiers having various controllable dynamic ranges. The amplified RF signal in the WCDMA signal transmission path is filtered by bandpass filter 726 to reject receive band frequencies and other out-of-band frequencies.

Each of the illustrated RF signal transmission paths is coupled to a dual mode power amplifier 740, which is further coupled to switchplexer 86 and antenna 22. As illustrated in FIG. 7, the amplified RF signal in the WCDMA signal transmission path is coupled to switchplexer 86 via duplexer 82. While the embodiment of the multi-mode multi-band transceiver 10 illustrated in FIG. 7 reveals a transmitter portion 20 suited for EDGE/GSM, WCDMA, and DCS/PCS modes of operation, other modes (TDD-WCDMA, TD-SCDMA, CDMA 2000, etc.) are not precluded from implementation within transceiver 10.

Figure 8:
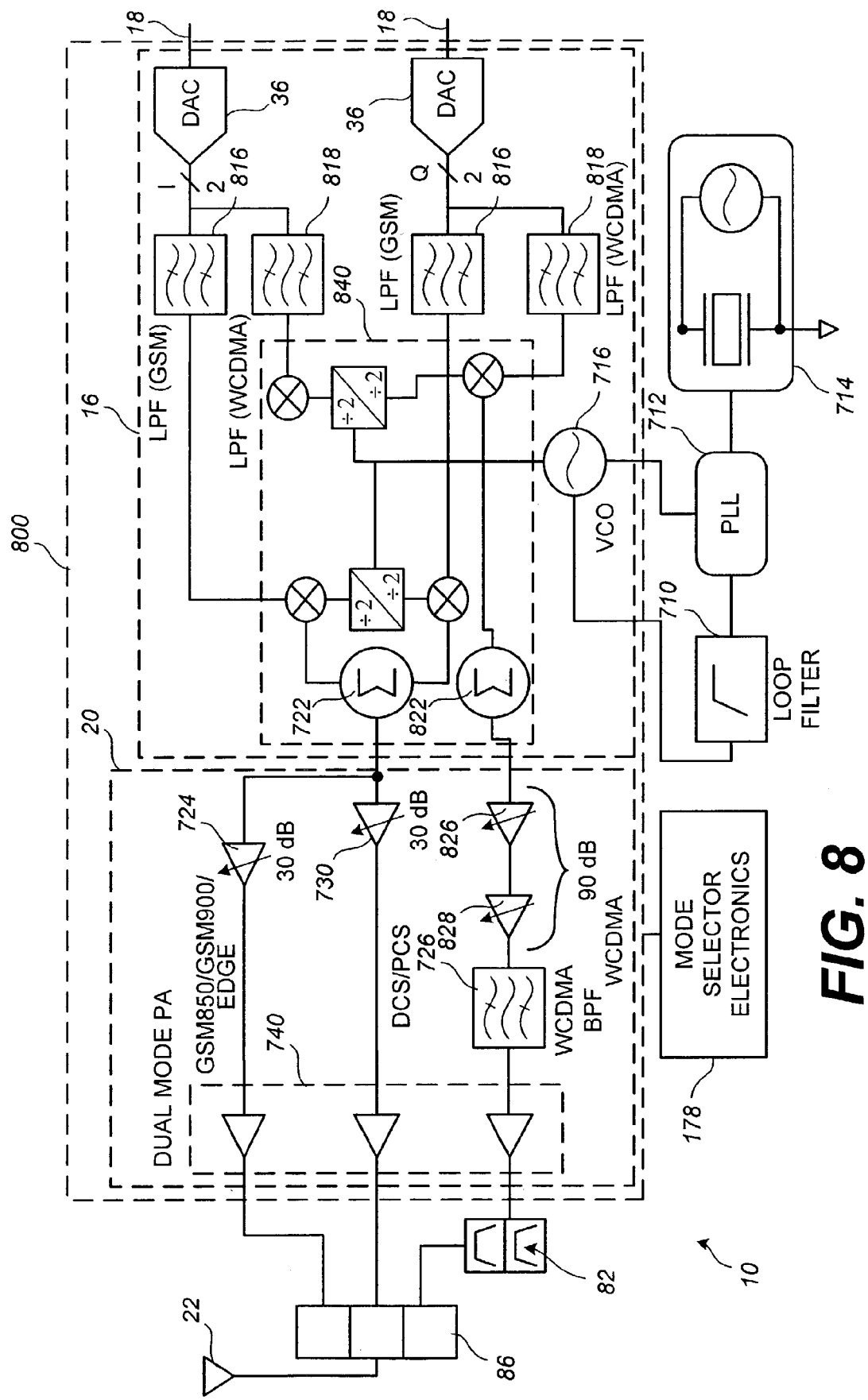
FIG. 8 is a block diagram illustrating an alternative embodiment of the common transmitter architecture of FIG. 7.

FIG. 8 illustrates an alternative embodiment of multi-mode multi-band transceiver 10 that uses a direct launch RF signal transmission technique to produce EDGE/GSM, WCDMA, and DCS/PCS compatible signal transmissions. Transceiver 10 includes antenna 22, switchplexer 86, duplexer 82, integrated transmitter 800 generally including elements depicted to be "on-chip" i.e., within an integrated circuit, and off-chip elements. Antenna 22 receives and is provided RF signals for transmission via switchplexer 86. Switchplexer 86 controllably routes both transmit to and receive signals from antenna 22 in response to a control signal supplied via mode selector electronics 178. When WCDMA signal transmissions are desired, duplexer 82 couples the integrated transmitter 800 to the switchplexer 86. Duplexer 82 is used to isolate the high and low frequency bands used by WCDMA communication signals.

Integrated transmitter 800 includes modulator 16 and transmitter portion 20. Modulator 16 is coupled to receive a transmit baseband information signal 18 from a signal source (not shown). Modulator 16 produces an analog signal in accordance with the select communication protocol (EDGE/GSM, WCDMA, or DCS/PCS, etc.) as directed by mode selector electronics 178. The signal source 18 is provided to modulator 16 as differential in-phase and quadrature signals (I and Q). The I and Q input signals are converted to analog representations of the digital I and Q signals in respective digital to analog converters (DAC) 36. The converted baseband signals are filtered via GSM low-pass filters 816 when EDGE/GSM signal transmissions are desired and WCDMA low-pass filters 818 when WCDMA signal transmissions are desired. EDGE/GSM low-pass filters are configured with a bandwidth of 100 kHz. WCDMA low-pass filters are configured with a bandwidth of 1.92 MHz. The filtered data signals are then forwarded to modulation electronics 40. Modulation electronics 40 receive the filtered baseband signals and upconvert the signals to the desired frequency for the select communication protocol. Modulation electronics 40 upconvert the filtered baseband signals under the control of VCO 716, loop filter 710, PLL 712, and VCTCXO 714. As illustrated in FIG. 8, modulation electronics 40 use one or more dividers to control mixers to complete the frequency upconversion. In the embodiment illustrated in FIG. 8, separate mixers are provided for EDGE/GSM and WCDMA baseband signals. The upconverted signals are then forwarded to respective summers which forward a RF output signal to the transmitter portion 20. EDGE/GSM and DCS/PCS RF signals are provided by summer 722. WCDMA RF signals are provided by summer 822.

Transmitter portion 20 includes multiple signal transmission paths. A first RF signal transmission path is configured with VGA 724 and is designated for EDGE/GSM. A second RF signal transmission path is configured with VGA 730 and is designated for DCS/PCS. A third RF signal transmission path is configured with VGA 826, VGA 828, and bandpass filter 726 and is designated for WCDMA. VGA 724 and VGA 730 designated for EDGE/GSM and DCS/PCS communication modes have a dynamic range of 30 dB. WCDMA power control requirements are met by cascading VGA 826, VGA 828, and power amplifier 740. The combination of VGA 826 and VGA 828 has a dynamic range of 90 dB. In alternative embodiments, the WCDMA dynamic range of 90 dB can be met via various combinations of discrete amplifiers having various controllable dynamic ranges. The amplified RF signal in the WCDMA signal transmission path is filtered by bandpass filter 726 to reject receive band frequencies and other out-of-band frequencies.

Each of the illustrated RF signal transmission paths is coupled to a dual mode power amplifier 740, which is further coupled to switchplexer 86 and antenna 22. As illustrated in FIG. 8, the amplified RF signal in the WCDMA signal transmission path is coupled to switchplexer 86 via duplexer 82.

The transceiver 10 illustrated in FIG. 8 includes a two-stage RF driver in the WCDMA signal transmission path to achieve the dynamic range required for WCDMA operation. A two-stage driver implementation reduces the difficulties associated with achieving the entire 90 dB dynamic range in a single amplifier stage. The transceiver 10 illustrated in FIG. 8 further differs from the transceiver illustrated in FIG. 7, in that it uses designated low-pass filters for the GSM and WCDMA baseband signals.

Figure 9:
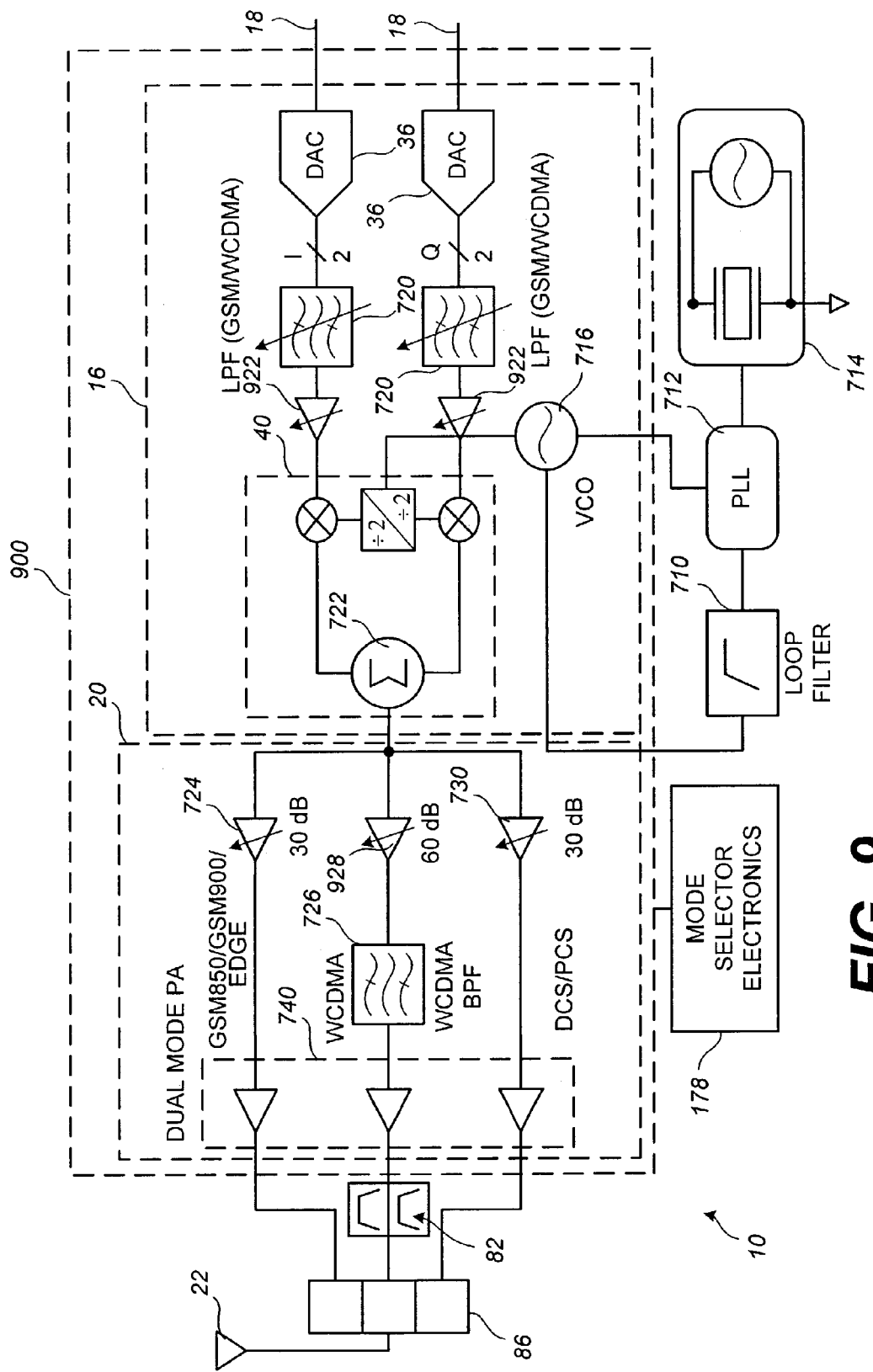
FIG. 9 is a block diagram illustrating a second alternative embodiment of the common transmitter architecture of FIG. 7.

FIG. 9 illustrates a second alternative embodiment of multi-mode multi-band transceiver 10 that uses a direct launch RF signal transmission technique to produce EDGE/GSM, WCDMA, and DCS/PCS compatible signal transmissions. Transceiver 10 includes antenna 22, switchplexer 86, duplexer 82, integrated transmitter 900 generally including elements depicted to be "on-chip" i.e., within an integrated circuit, and off-chip elements. Antenna 22 receives and is provided RF signals for transmission via switchplexer 86. Switchplexer 86 controllably routes both transmit to and receive signals from antenna 22 in response to a control signal supplied via mode selector electronics 178. When WCDMA signal transmissions are desired, duplexer 82 couples the integrated transmitter 900 to the switchplexer 86. Duplexer 82 is used to isolate the high and low frequency bands used by WCDMA communication signals.

Integrated transmitter 900 includes modulator 16 and transmitter portion 20. Modulator 16 is coupled to receive a transmit baseband information signal 18 from a signal source (not shown). Modulator 16 produces an analog signal in accordance with the select communication protocol (EDGE/GSM, WCDMA, or DCS/PCS, etc.) as directed by mode selector electronics 178. The signal source 18 is provided to modulator 16 as differential in-phase and quadrature signals (I and Q). The I and Q input signals are converted to analog representations of the digital I and Q signals in respective digital to analog converters (DAC) 36. The converted baseband signals are filtered via low-pass filters 720. Low-pass filters 720 are switched as desired to accommodate the different bandwidths of the various communication protocols (e.g., 100 kHz for EDGE/GSM; 1.92 MHz for WCDMA). The filtered data signals are then forwarded to VGA 922 for amplification prior to being provided at the input to modulation electronics 40. Modulation electronics 40 receive the filtered baseband signals and upconvert the signals to the desired frequency for the select communication protocol. Modulation electronics 40 upconvert the filtered baseband signals under the control of VCO 716, loop filter 710, PLL 712, and VCTCXO 714. As illustrated in FIG. 9, modulation electronics 40 use one or more dividers to control mixers to complete the frequency upconversion. In the embodiment illustrated in FIG. 9, shared mixers are provided for EDGE/GSM and WCDMA baseband signals. The upconverted signals are then forwarded to summer 722 which forwards a RF output signal to the transmitter portion 20.

Transmitter portion 20 includes multiple signal transmission paths. A first RF signal transmission path is configured with VGA 724 and is designated for EDGE/GSM. A second RF signal transmission path is configured with VGA 928 and bandpass filter 726 and is designated for WCDMA. A third RF signal transmission path is configured with VGA 730 and is designated for DCS/PCS. VGA 724 and VGA 730 designated for EDGE/GSM and DCS/PCS communication modes have a dynamic range of 30 dB. WCDMA power control requirements are met via the combination of VGA 922 in modulator 16, VGA 928 and power amplifier 740. The combination of VGA 922, VGA 928 and power amplifier 740 provides a dynamic range of 90 dB. The amplified RF signal in the WCDMA signal transmission path is filtered by bandpass filter 726 to reject receive band frequencies and other out-of-band frequencies.

Each of the illustrated RF signal transmission paths is coupled to the dual mode power amplifier 740, which is further coupled to switchplexer 86 and antenna 22. As illustrated in FIG. 9, the amplified RF signal in the WCDMA signal transmission path is coupled to switchplexer 86 via duplexer 82.

The transceiver 10 illustrated in FIG. 9 shares the responsibility of amplifying the signals between the modulator 16 and the transmitter portion 20. While increased dynamic range may not be required for EDGE/GSM operating modes where the requirement is on the order of 30 dB of total dynamic range, the 90 dB dynamic range of WCDMA can be achieved by adding VGA 922 in the modulator 16. It should be noted that a maximum carrier leakage at the output of the modulator 16 (e.g., 20 dB below the signal at minimum power and approximately 35 dB below the signal at maximum power) limits the range of amplification that can be provided in the modulator 16.

Figure 10A:
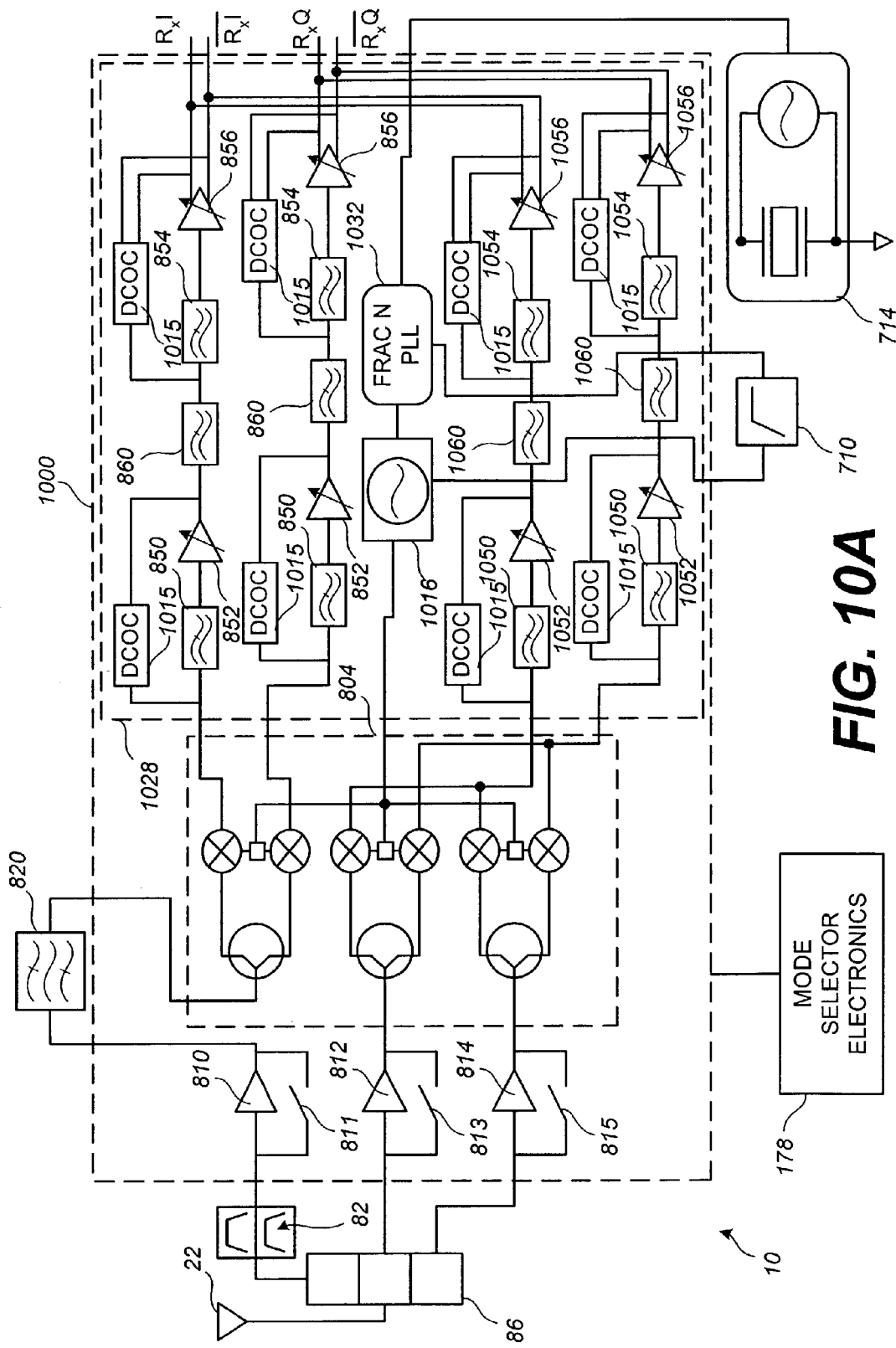
FIG. 10A is a block diagram illustrating an embodiment of a common receiver architecture for a shared functional block simultaneous operation of WCDMA/GSM or CDMA 2000/GSM communication protocols in a single transceiver.

FIG. 10A illustrates a first embodiment for a multi-mode transceiver 10 that receives RF signal transmissions and generates baseband signals for EDGE/GSM, WCDMA, and DCS/PCS compatible communications. The multi-mode transceiver 10 supports simultaneous WCDMA/GSM operation and when appropriately configured can support simultaneous CDMA 2000/GSM operation.

Transceiver 10 includes antenna 22, switchplexer 86, duplexer 82, integrated receiver 1000 generally including elements depicted to be "on-chip" i.e., within an integrated circuit, and off-chip elements. Antenna 22 receives RF signals for via switchplexer 86. Switchplexer 86 controllably routes both transmit to and receive signals from antenna 22 in response to a control signal supplied via mode selector electronics 178. When WCDMA signal transmissions are desired, duplexer 82 couples the integrated transmitter 1000 to the switchplexer 86. Duplexer 82 is used to isolate the high and low frequency bands used by WCDMA communication signals.

A remote signal source (not shown) is intercepted by antenna 22 and coupled to integrated receiver 1000 via switchplexer 86 and LNAs 810, 812, and 814. When the transceiver 10 is operating in a WCDMA mode, intercepted signal transmissions are coupled to integrated receiver 1000 via duplexer 82. The intercepted signal transmissions are amplified by LNA 810 and filtered by SAW filter 820 prior to frequency downconversion in receiver portion 804.

Integrated receiver 1000 includes receiver portion 804 and demodulator 1028. Receiver portion 804 is coupled to receive a RF information signal from one or more low noise amplifiers 810, 812, and 814 each of which can be controllably bypassed via respective switches 811, 813, and 815. Switches 811, 813, and 815 are controlled via signals provided by mode selector electronics 178. Receiver portion 804 functions in accordance with VCO 1016 PLL 1032, loop filter 710, and VCTCXO 714 to downconvert the received RF information signal to generate in-phase and quadrature information signals. Demodulator 1028 produces a signal in accordance with the RF of the select communication protocol (EDGE/GSM, WCDMA, or DCS/PCS, etc.) as directed by mode selector electronics 178. Integrated receiver 1000 includes a first receive path designated for processing WCDMA communication signals and a second receive path designated for processing EDGE/GSM and DCS/PCS communication signals.

The first receive path in demodulator 1028 includes separate I and not I signal processing paths as well as separate Q and not Q signal processing paths. The first receive signal processing paths include analog filter 850 and programmable LNA 852 in series with each other, with the series combination coupled in parallel to a DC offset corrector (DCOC) 1015. The output of the parallel coupled filter and amplifier are further filtered by a higher order filter formed via filter 860, analog filter 854, programmable LNA 856, and another DCOC 1015. Cascading these elements in the receive signal processing paths eases the dynamic range required of the various elements as well as the noise figure requirements of the separate filters 850, 854, and 860.

Second receive signal processing paths include digital filter 1050 and PGA 1052 in series with each other, with the series combination coupled in parallel to a DCOC 1015. The output of the parallel coupled filter and amplifier are further filtered by a higher order filter formed via digital filter 1060, digital filter 1054, PGA 1062, and another DCOC 1015.

The first receive signal processing paths can be preceded by an on-chip digital to analog converter (not illustrated) to permit analog control signals to be used in the processing of WCDMA signals. Conversely, the second receive signal processing paths can remain digital for processing EDGE/GSM and DCS/PCS signals.

Because the downconversion process implemented by integrated receiver 1000 is representative of a direct frequency conversion technique, DC offsets should be corrected. DC offset correctors (DCOCs) can be implemented for GSM and WCDMA communication protocols in different ways. For example, a sample and hold circuit may be used for DC offset correction during idle time slots in GSM and a continuous servo loop may be used for WCDMA.

Figure 10B:
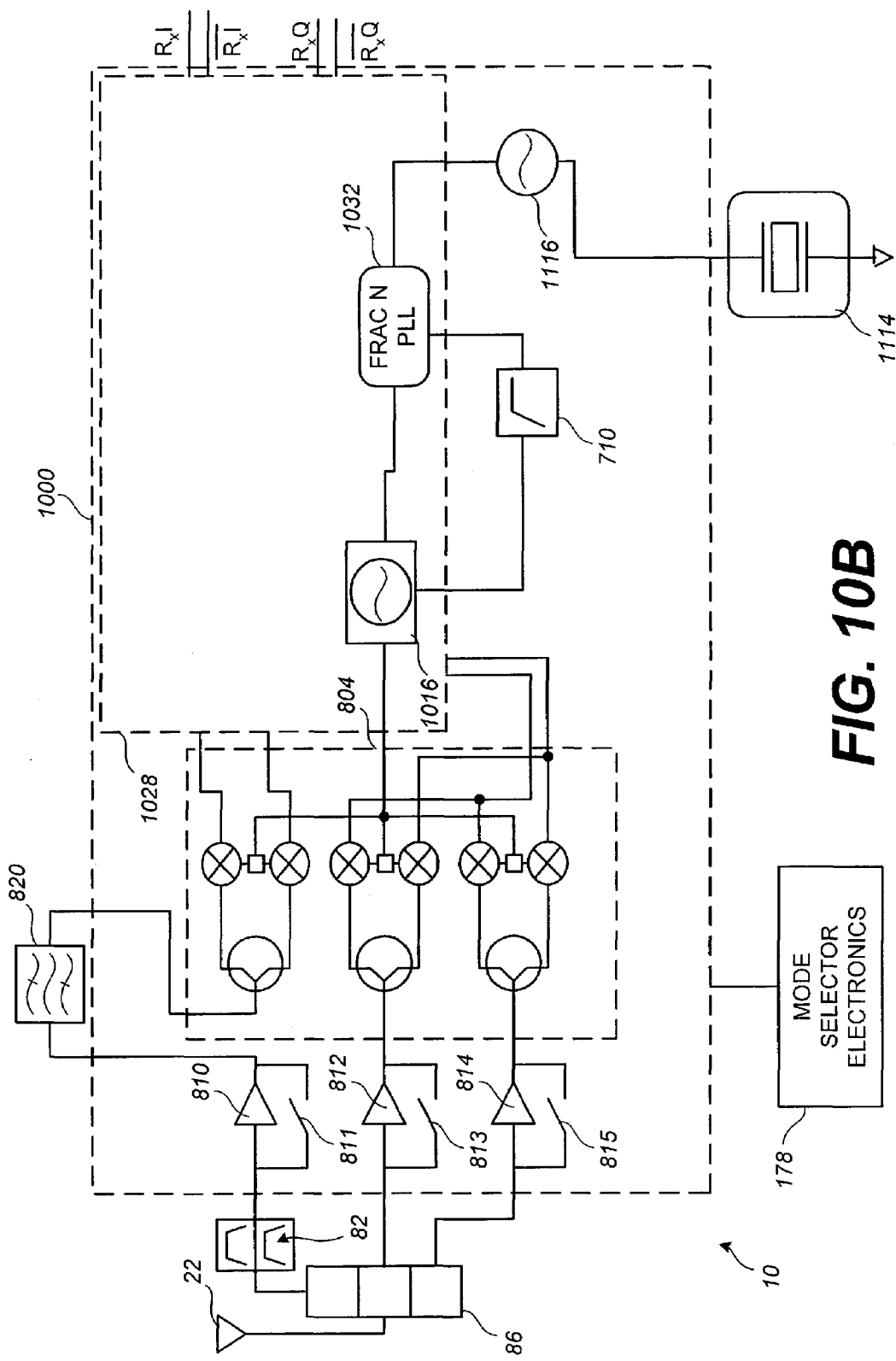
FIG. 10B is a block diagram illustrating an alternative embodiment of the common receiver architecture of FIG. 10A.

FIG. 10B illustrates an alternative embodiment of the common receiver architecture presented in FIG. 10A. As shown in FIG. 10B, a crystal oscillator 1116 and loop filter 710 are implemented within integrated receiver 1000. While the crystal oscillator 1116 and loop filter 710 are excluded from demodulator 1028 in the architecture depicted in FIG. 10B, it should be understood that one or both of the crystal oscillator 1116 and loop filter 710 may be included within the demodulator 1028 as desired. As described above in association with FIG. 10A, receiver portion 804 functions in accordance with VCO 1016 PLL 1032, loop filter 710, and VCTCXO 714 to downconvert the received RF information signal to generate in-phase and quadrature information signals in accordance with one or more desired communication protocols (e.g., WCDMA/GSM or CDMA 2000/GSM operation).

Figure 10C:
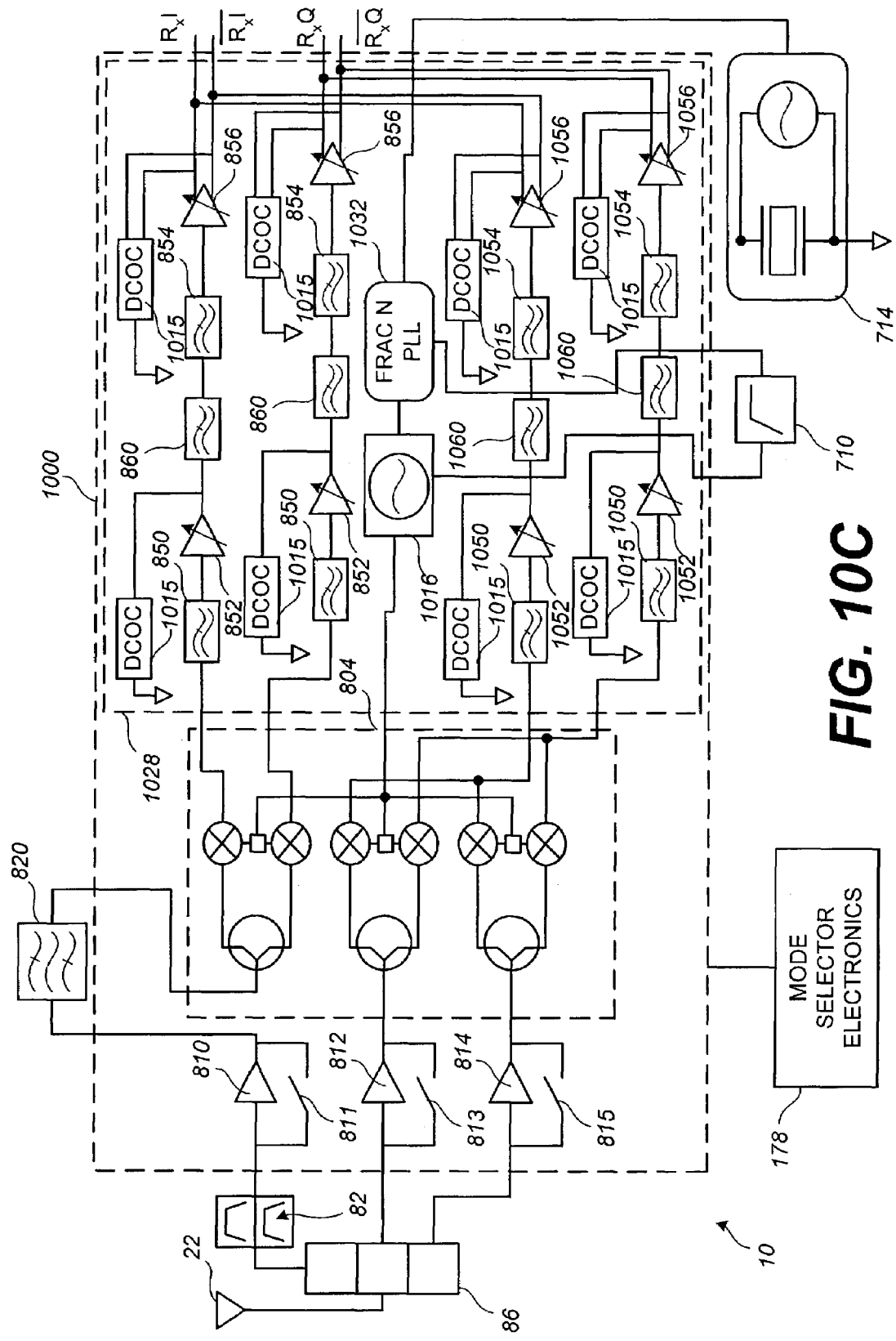
FIG. 10C is a block diagram illustrating a second alternative embodiment of the common receiver architecture of FIG. 10A.

FIG. 10C is a block diagram illustrating a second alternative embodiment of the common receiver architecture of FIG. 10A. As shown in FIG. 10C, a DCOC 1015 is inserted to correct any DC offset present at the output of each of the programmable LNAs 852 in the WCDMA signal path. A second DCOC 1015 is inserted at the output of programmable LNAs 856. Each of the DCOCs 1015 is referenced to electrical ground. As further illustrated in FIG. 10C, a DCOC 1015 is inserted to correct any DC offset present at the output of each of the programmable LNAs 1052 in the GSM path of the demodulator 1028. A second DCOC 1015 is inserted at the output of programmable LNAs 1056 to correct DC offsets present in the I, not I, Q, and not Q output signals of demodulator 1028.

Figure 10D:
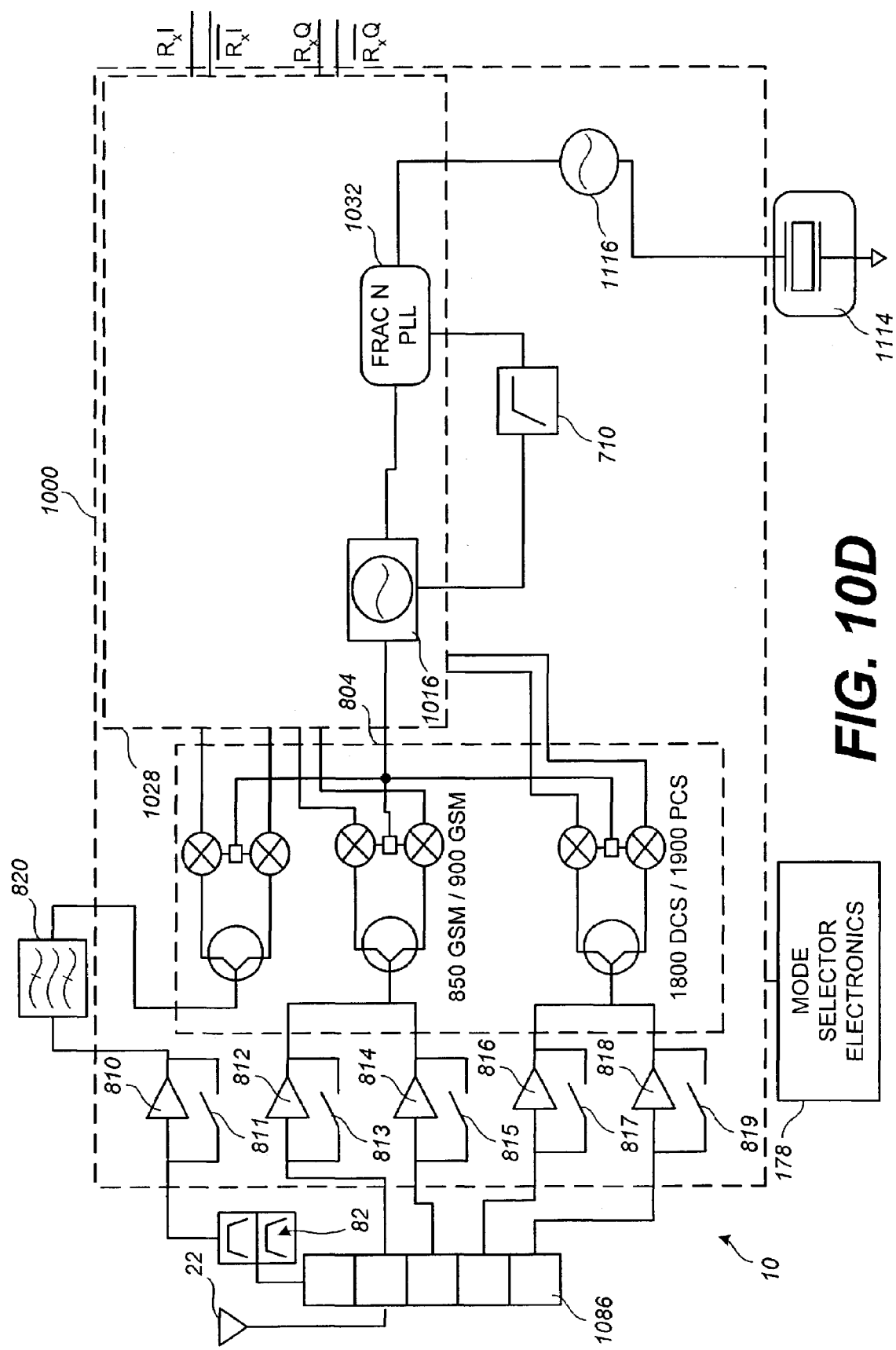
FIG. 10D is a block diagram illustrating a third alternative embodiment of the common receiver architecture of FIG. 10A.

FIG. 10D is a block diagram illustrating a third alternative embodiment of the common receiver architecture of FIG. 10A. In the architecture shown in FIG. 10D, switchplexer 1086 is configured with additional frequency filters to forward received RF energy to selectable LNAs 810, 812, 814, 816, and 818. Each of the LNAs 810, 812, 814, 816, and 818 can be selectively bypassed by closing corresponding switches 811, 813, 815, 817, and 819. As further illustrated in FIG. 10D, the output from LNA 810 is applied to the input of SAW filter 820 before being forwarded to a first downconverter within receiver portion 804. The output from LNA 812 and the output from LNA 814 are coupled to form the input to a 850 GSM/900 GSM downconverter within receiver portion 804. The output from LNA 816 and the output from LNA 818 are coupled to form the input to a 1800 DCS/1900 PCS downconverter within receiver portion 804. Thus, the output from LNA 812 and the output from LNA 814 use a single common downconverter and the output from LNA 816 and the output from LNA 818 use a second common downconverter.

It should be understood that switchplexer 1086 and LNAs 810, 812, 814, 816, and 818 although described in connection with particular frequencies and/or communication protocols in the various transceiver architectures (e.g., 850 GSM or 850 MHz GSM; 900 GSM or 900 MHz GSM; 1800 DCS or 1800 MHz DCS; etc.) are not so limited. Stated another way, the individual elements described above can be modified as desired to support other communication standards including next generation cellular communication standards.

Figure 11:
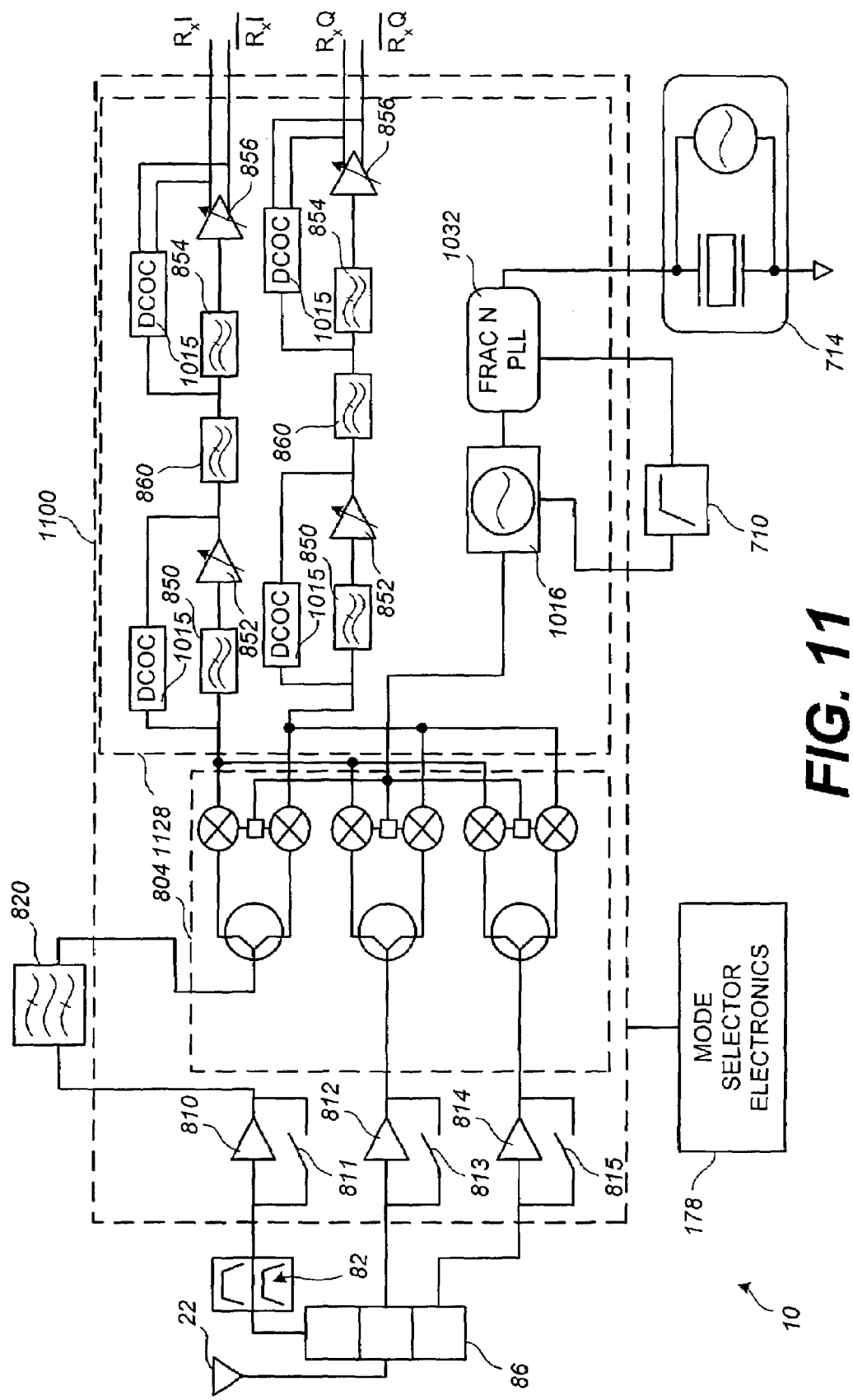
FIG. 11 is a block diagram illustrating an embodiment of a common receiver architecture that supports multiplexed (non-simultaneous) operation of GSM/WCDMA or GSM/CDMA 2000 communication protocols in a multi-mode transceiver.

FIG. 11 illustrates a second embodiment for a multi-mode transceiver 10 that receives RF signal transmissions and generates baseband signals for EDGE (GSM), WCDMA, and DCS/PCS compatible communications. The multi-mode transceiver architecture illustrated in FIG. 11 supports a directed (e.g., multiplexed) mode for non-simultaneous operation of WCDMA/GSM or CDMA 2000/GSM. Transceiver 10 includes antenna 22, switchplexer 86, duplexer 82, integrated receiver 1100, and off-chip elements. Antenna 22 receives RF signals for via switchplexer 86. When WCDMA signal transmissions are desired, duplexer 82 couples the integrated receiver 1100 to the switchplexer 86.

A remote signal source (not shown) is intercepted by antenna 22 and coupled to integrated receiver 1100 via switchplexer 86 and LNAs 810, 812, and 814. When the transceiver 10 is operating in a WCDMA mode, intercepted signal transmissions are coupled to integrated receiver 1100 via duplexer 82. The intercepted signal transmissions are amplified by LNA 810 and filtered by SAW filter 820 prior to frequency downconversion in receiver portion 804.

Integrated receiver 1100 includes receiver portion 804 and demodulator 1028. Receiver portion 804 is coupled to receive a RF information signal from one or more low noise amplifiers 810, 812, and 814 each of which can be controllably bypassed via respective switches 811, 813, and 815. Switches 811, 813, and 815 are controlled via signals provided by mode selector electronics 178. Receiver portion 804 functions in accordance with VCO 1016 PLL 1032, loop filter 710 and VCTCXO 714 to downconvert the received RF information signal to generate in-phase and quadrature information signals. Demodulator 1028 produces a signal in accordance with the RF of the select communication protocol (EDGE, WCDMA, or DCS/PCS, etc.) as directed by mode selector electronics 178. Integrated receiver 1100 includes a common receive path designated for processing WCDMA, EDGE, and DCS/PCS communication signals.

The common receive path in demodulator 1028 includes separate I and not I signal processing paths as well as separate Q and not Q signal processing paths. The common receive signal processing paths include analog filter 850 and programmable LNA 852 in series with each other, with the series combination coupled in parallel to a DC offset corrector (DCOC) 1015. The output of the parallel coupled filter and amplifier are further filtered by a higher order filter formed via filter 860, analog filter 854, programmable LNA 856, and another DCOC 1015. Cascading these elements in the receive signal processing path eases the dynamic range required of the various elements as well as the noise figure requirements of the separate filters 850, 854, and 860.

It should be understood that the various modifications illustrated in FIGS. 10B, 10C, and 10D above can be applied to the common receiver architecture illustrated in FIG. 11. Accordingly, the architecture illustrated and described in association with FIG. 11 can be modified to include an option where loop filter 710 and crystal oscillator 1016 are included within integrated receiver 1100. In addition, switchplexer 1086 can be modified to produce additional output signals that may be forwarded to appropriately configured LNAs 816 and 818 (shown in FIG. 10D). When LNAs 816 and 818 are configured to amplify 1800 DCS and 1900 PCS signals, the output of LNAs 816 and 818 can be coupled and applied to a single downconverter configured to process signals within these frequency bands. Furthermore, DCOC loops can be applied at the outputs of the various functional elements within demodulator 1028 as illustrated in FIG. 10D.

Figure 12:
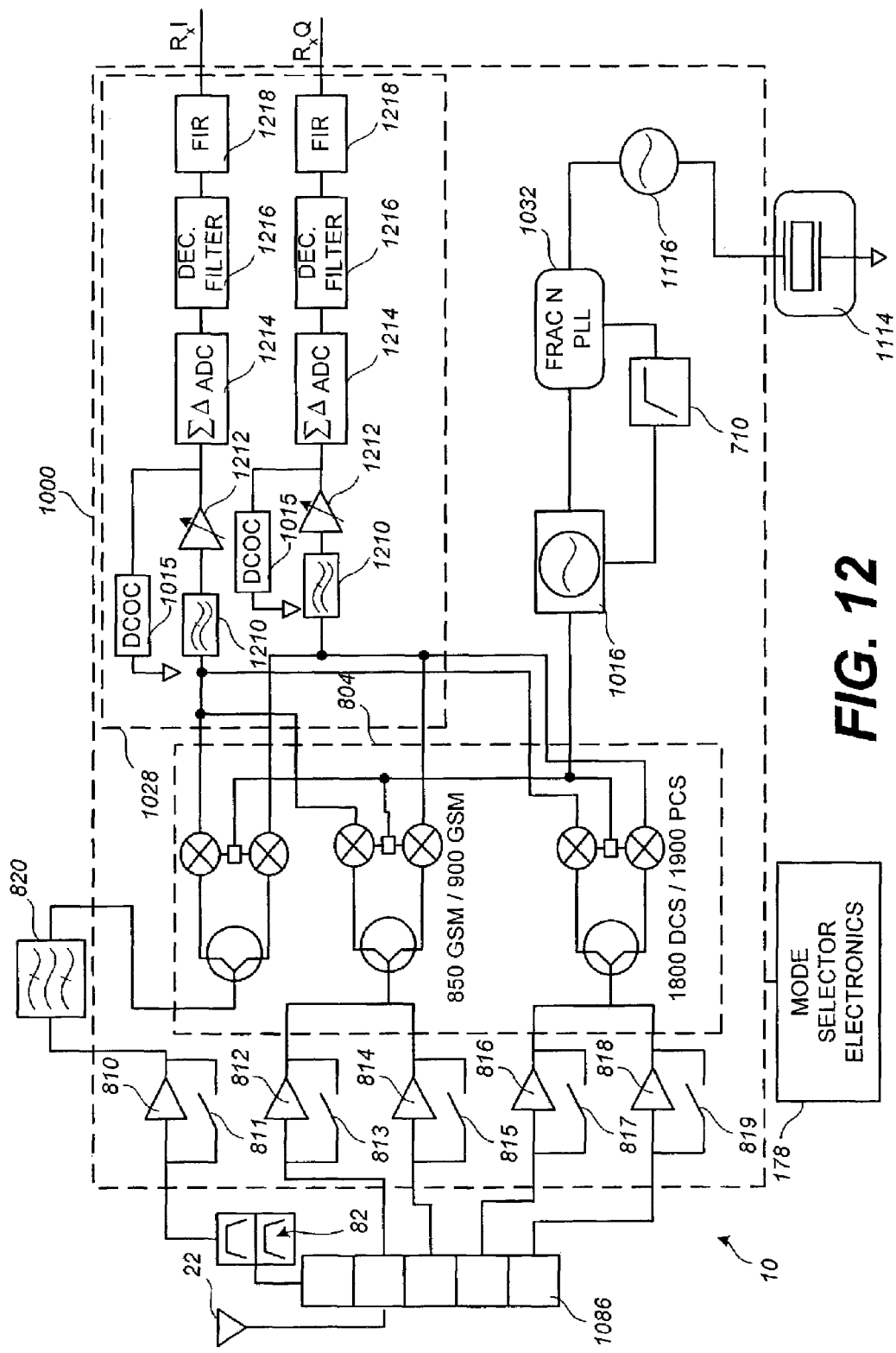
FIG. 12 is a block diagram illustrating an embodiment of a common receiver architecture that supports multi-mode digital operation of GSM/GPRS/EDGE and UMTS communication protocols in a multi-mode transceiver.

FIG. 12 is a block diagram illustrating an embodiment of a common receiver architecture that supports multi-mode digital operation of GSM/GPRS/EDGE and UMTS communication protocols in a multi-mode transceiver. Transceiver 10 includes antenna 22, switchplexer 1086, duplexer 82, and integrated receiver 1000 generally including elements depicted to be "on-chip" i.e., within an integrated circuit, and off-chip elements. Antenna 22 receives RF signals for via switchplexer 1086. Switchplexer 1086 controllably routes both transmit to and receive signals from antenna 22 in response to a control signal supplied via mode selector electronics 178. When UMTS signal transmissions are desired, duplexer 82 couples the integrated transmitter 1000 to the switchplexer 1086. Duplexer 82 is used to isolate the high and low frequency bands used by UMTS communication signals.

A remote signal source (not shown) is intercepted by antenna 22 and coupled to integrated receiver 1000 via switchplexer 1086 and LNAs 810, 812, 814, 816, and 817. When the transceiver 10 is operating in a UMTS mode, intercepted signal transmissions are coupled to integrated receiver 1000 via duplexer 82. The intercepted signal transmissions are amplified by LNA 810 and filtered by SAW filter 820 prior to frequency downconversion in receiver portion 804.

Integrated receiver 1000 includes receiver portion 804 and demodulator 1028. Receiver portion 804 is coupled to receive a RF information signal from one or more low noise amplifiers 810, 812, 814, 816, and 818 each of which can be controllably bypassed via respective switches 811, 813, 815, 817, and 819. Switches 811, 813, 815, 817, and 819 are controlled via signals provided by mode selector electronics 178. Receiver portion 804 functions in accordance with VCO 1016, PLL 1032, loop filter 710, crystal oscillator 1116, and crystal 11114 VCTCXO 714 to downconvert the received RF information signal to generate in-phase and quadrature information signals. Demodulator 1028 produces a signal in accordance with the RF of the select communication protocol (e.g., GSM/EDGE/GPRS, or UMTS) as directed by mode selector electronics 178.

A first receive path in demodulator 1028 produces an in phase or I signal processing path. A second receive path in demodulator 1028 produces a quadrature or Q signal processing path. The first receive path includes anti-aliasing filter 1210 and programmable gain amplifier (PGA) 1212 in series with each other, with the series combination coupled in parallel to a DC offset corrector (DCOC) 1015. The output of the parallel coupled filter and amplifier are further processed by sigma delta analog to digital converter (ADC) 1214. The digitized output of the sigma delta ADC 1214 is processed by decimation filter 1216 before being filtered by finite impulse response (FIR) filter 1218. In some embodiments, FIR filter 1218 may include additional signal processing configured to correct pass band attenuation, sometimes referred to as signal droop, introduced by the decimation filter 1216. As illustrated in FIG. 12, the second receive path is configured in the same manner as the first receive path. Thus, the second receive path processes the Q signal in the same manner as the first receive path processes the I signal.

According to the sampling theorem, any signal can be accurately reconstructed from values sampled at uniform intervals as long as the signal is sampled at a rate at least twice the highest frequency present in the signal. Failure to satisfy this requirement will result in aliasing of higher-frequency signal components, meaning that these components will appear to have frequencies lower than their true values. Anti-aliasing filter 1210 avoids aliasing by applying a low-pass filter to the signal, prior to the sampling stage, to remove any frequency components above the "folding" or Nyquist frequency (half the sampling frequency).

The anti-aliasing filter rejects out-of-band signals. Thus, preventing out-of-band signals from possibly saturating the analog to digital converter in the subsequent element. The anti-aliasing filter 1210 also attenuates undesirable signals generated by the sampling clocks in the sigma delta converter. The anti-aliasing filter 1210 can be implemented using conventional analog circuitry. Alternatively, the anti-aliasing filter 1210 can be implemented digitally by sampling the input signal at multiple rates and correcting any signal sampling errors. A digital anti-aliasing filter avoids the noise and drift problems inherent in analog filter circuits.

Programmable gain amplifier 1212 provides variable gain to the output produced by the anti-aliasing filter 1210. Receive signal power can vary considerably in cellular communication systems. Accordingly, signal power adjustments may be applied as necessary by programmable gain amplifier 1212 in both UMTS and GSM/EDGE/GPRS modes of operation.

The power adjusted output of the programmable gain amplifier 1212 is then digitized by the sigma delta ADC 1214 before channel selection processing by the decimation filter 1216 and the FIR filter 1218. It should be understood that the sampling clock of the sigma delta ADC 1214 will require adjustment to meet the bandwidth requirements of each the various communication protocols.

Because the downconversion process implemented by integrated receiver 1000 is representative of a direct frequency conversion technique, DC offsets are corrected. DC offset correctors (DCOCs) are placed at the output of the programmable gain amplifiers 1212. As described above, a sample and hold circuit may be used for DC offset correction during idle time slots in GSM and a continuous servo loop may be used for WCDMA.

Figure 13:
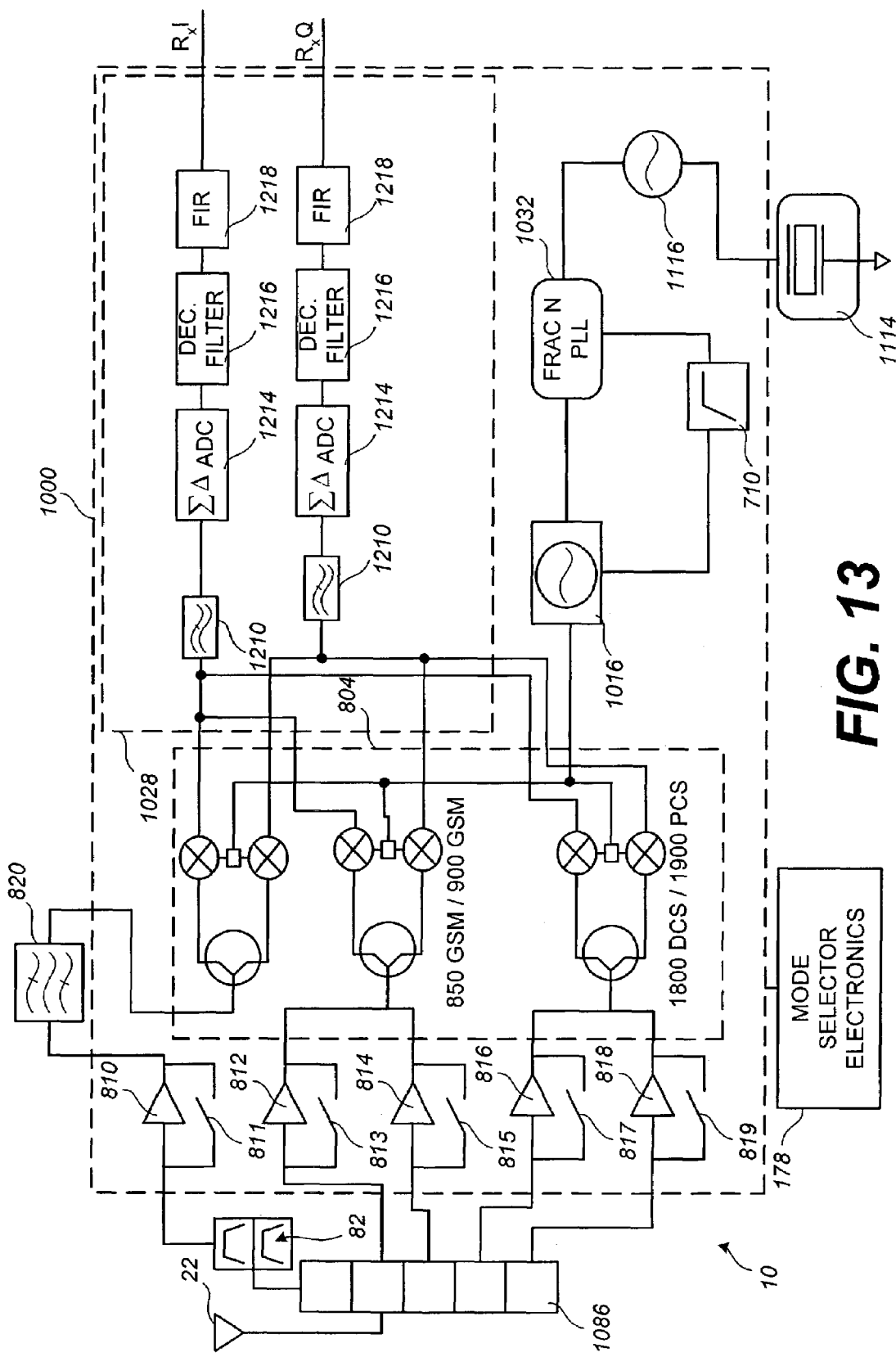
FIG. 13 is a block diagram illustrating an alternative embodiment of the common receiver architecture of FIG. 11.

FIG. 13 is a block diagram illustrating an alternative embodiment of the common receiver architecture of FIG. 11. The architecture illustrated in FIG. 13 uses a high dynamic range sigma delta ADC 1214 in lieu of the programmable gain amplifiers 1212 to controllably vary the I and Q signal power levels.

Figure 14:
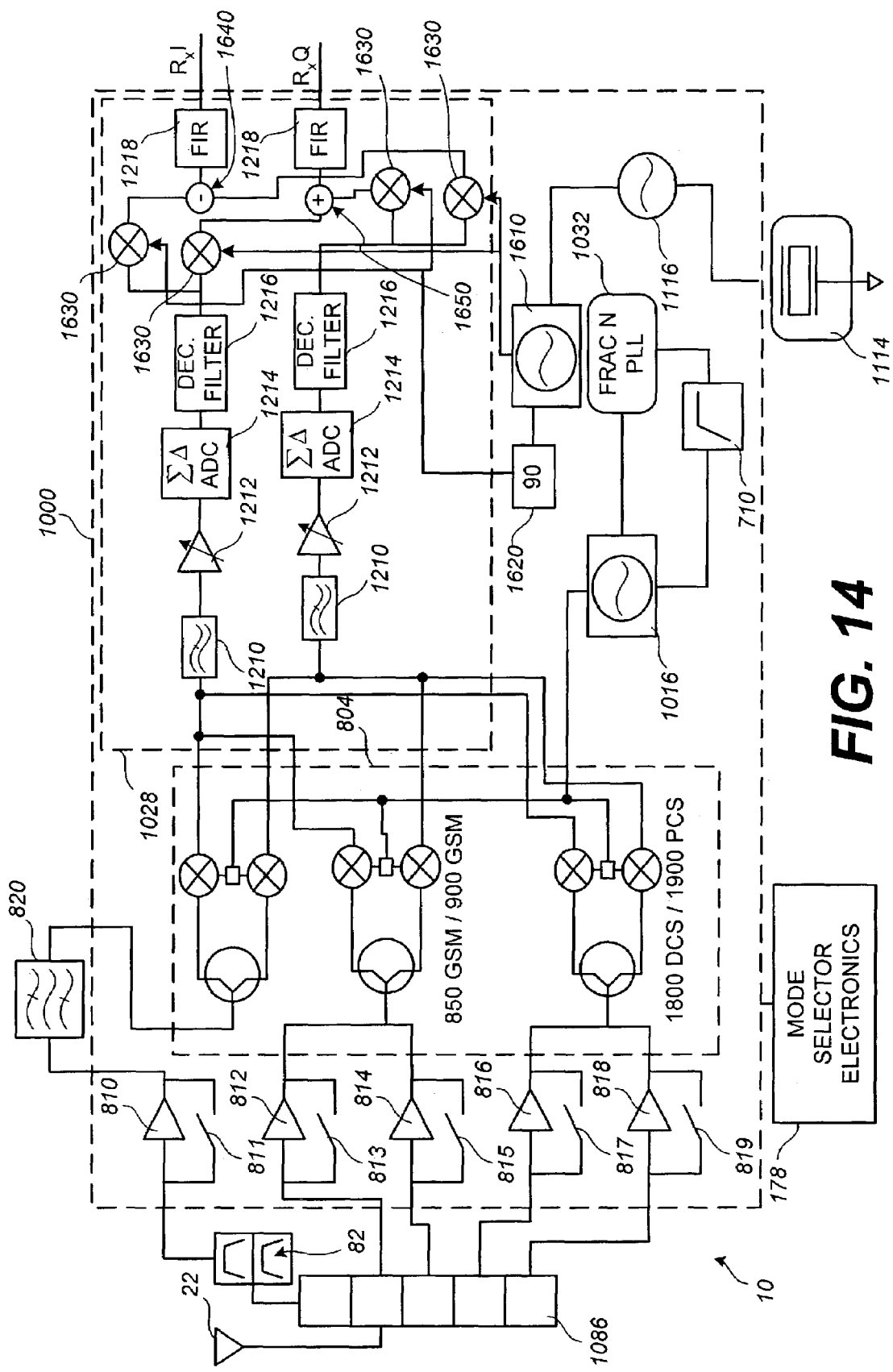
FIG. 14 is a block diagram illustrating a second alternative embodiment of the common receiver architecture of FIG. 11.

FIG. 14 is a block diagram illustrating a second alternative embodiment of the common receiver architecture of FIG. 11. The architecture shown in FIG. 14 includes digital mixers 1630 under the control of oscillator 1610 and phase shifter 1620 to support a low intermediate frequency (IF) GSM mode of operation. Summers 1640 and 1650 receive the mixer outputs and forward the I and Q signals to the FIR filters 1218.

In accordance with the foregoing description, preferred embodiments of the shared functional block multi-mode multi-band transceiver provide a system that shares frequency sources, amplifiers, downconverters, and mixers between transmitters and receivers and between bands to minimize size, weight, complexity, power consumption, and cost.

The foregoing description of preferred embodiments of the invention has been presented for the purposes of illustration and description. It is not intended to be exhaustive or to limit the invention to the precise form disclosed. It is intended that the scope of the invention be limited not by this detailed description, but rather by the claims appended hereto.

What is claimed is:

1. A multi-mode, multiple-band transceiver, comprising:
a controllable oscillator;
a multiple channel transmitter comprising:
a first selectable transmit path comprising a first variable gain amplifier, the first selectable transmit path configured to use a direct launch signal transmission technique to generate radio-frequency signals using a first multiple-access communication protocol;
a second selectable transmit path comprising a second variable gain amplifier, the second selectable transmit path configured to use a direct launch signal transmission technique to generate radio-frequency signals using a second multiple-access communication protocol;
a power amplifier coupled to the first and second variable gain amplifiers; and
a modulator comprising:
a first low pass filter corresponding to an in-phase component of either the first or second multiple-access communication protocol;
a second low pass filter corresponding to a quadrature component of either the first or second multiple-access communication protocol; and
modulation electronics connected to the first and second variable gain amplifiers, the first and second low pass filters, and the controllable oscillator.

2. The transceiver of claim 1, wherein the modulation electronics comprises a first mixer and a second mixer, the first and second mixers coupled to a divider, the first and second mixers coupled to a summer, the summer directly connected to the first and second variable gain amplifiers.

3. The transceiver of claim 1, wherein the controllable oscillator comprises a voltage controllable oscillator.

4. The transceiver of claim 1, wherein the first multiple-access communication protocol comprises wideband code division multiple access (WCDMA).

5. The transceiver of claim 4, further comprising a band pass filter coupled between the power amplifier and the first variable gain amplifier.

6. The transceiver of claim 1, wherein the second multiple-access communication protocol comprises one of global system for mobile (GSM) communication and enhanced data for GSM evolution.

7. The transceiver of claim 1, further comprising a third selectable transmit path having a third variable gain amplifier, the third selectable transmit path configured to generate radio-frequency signals using a third multiple-access communication protocol, wherein the third selectable transmit path uses a direct launch signal transmission technique.

8. The transceiver of claim 7, wherein the third multiple-access communication protocol comprises at least one of Personal Communications System (PCS) and Data Communications System (DCS).

9. The transceiver of claim 1, further comprising a fourth variable gain amplifier coupled between the first low pass filter and the modulation electronics.

10. The transceiver of claim 9, further comprising a fifth Variable gain amplifier coupled between the second low pass filter and the modulation electronics.

11. The transceiver of claim 1, further comprising mode selector electronics coupled to the transceiver to provide mode select functionality.

12. The transceiver of claim 1, wherein the modulator, the controllable oscillator, and the transmitter are fabricated on a single integrated circuit.

13. The transceiver of claim 1, further comprising a first switch configured to enable at least one of the first and second transmit paths to transmit a communication signal using at least one of the first and the second multiple-access communication protocols.

14. The transceiver of claim 1, further comprising a multiple channel receiver configured to receive radio-frequency signals using at least the first and second multiple-access communication protocols, said multiple channel receiver including a plurality of selectable receive channel components, the plurality of selectable receive channel components coupled to a demodulator configured to produce an in-phase data signal channel and a quadrature data signal channel; and a second switch configured to enable at least one of the receive channel components to receive a communication signal using one of the first and second multiple access communication protocols.

15. The transceiver of claim 14, wherein each of the in-phase data signal channel and the quadrature data signal channel comprise a receive-side variable gain amplifier.

16. The transceiver of claim 14, wherein each of the in-phase data signal channel and the quadrature data signal channel comprise a second-order bandpass filter.

17. The transceiver of claim 14, wherein each of the in-phase data signal channel and the quadrature data signal channel comprise at least one additional bandpass filter.

18. The transceiver of claim 17, wherein the at least one additional bandpass filter has a filter order greater than two.

19. The transceiver of claim 14, wherein each of the in-phase data signal channel and the quadrature data signal channel comprise a direct-coupled offset corrector.

20. The transceiver of claim 19, wherein the direct-coupled offset corrector comprises a sample and hold circuit.

21. The transceiver of claim 19, wherein the direct-coupled offset corrector comprises a continuous servo loop.

22. A multi-mode, multiple-band transceiver, comprising:
a controllable oscillator;
a multiple channel transmitter comprising:
a first selectable transmit path comprising cascaded first and second variable gain amplifiers, the first selectable transmit path configured to use a direct launch signal transmission technique to generate radio-frequency signals using a first multiple-access communication protocol; and
a second selectable transmit path comprising a third variable gain amplifier, the second selectable transmit path configured to use a direct launch signal transmission technique to generate radio-frequency signals using a second multiple-access communication protocol;
a power amplifier coupled to the first, second, and third variable gain amplifiers; and
a modulator comprising:
a first low pass filter corresponding to an in-phase component of the first multiple-access communication protocol;
a second low pass filter corresponding to an in-phase component of the second multiple-access communication protocol;
a third low pass filter corresponding to a quadrature component of the first multiple-access communication protocol;
a fourth low pass filter corresponding to a quadrature component of the second multiple-access communication protocol; and
modulation electronics connected to the first and third variable gain amplifiers, the first, second, third, and fourth low pass filters, and the controllable oscillator.

23. The transceiver of claim 22, wherein the modulation electronics comprises a first mixer and a second mixer, the first and second mixers coupled to a first divider, the first and second mixers coupled to the second and fourth low pass filters, respectively, the first and second mixers coupled to a first summer, the first summer directly connected to the third variable gain amplifier.

24. The transceiver of claim 23, wherein the modulation electronics further comprises a third mixer and a fourth mixer, the third and fourth mixers coupled to the first and third low pass filters, respectively, the third and fourth mixers coupled to a second divider, the second divider coupled to the first divider and to the controllable oscillator, the fourth mixer coupled to a second summer, the second summer directly connected to the first variable gain amplifier.

25. The transceiver of claim 22, wherein the controllable oscillator comprises a voltage controllable oscillator.

26. The transceiver of claim 22, wherein the first multiple-access communication protocol comprises wideband code division multiple access (WCDMA).

27. The transceiver of claim 22, further comprising a band pass filter coupled between the power amplifier and the second variable gain amplifier.

28. The transceiver of claim 22, wherein the second multiple-access communication protocol comprises one of global system for mobile (GSM) communication and enhanced data for GSM evolution.

29. The transceiver of claim 22, further comprising a third selectable transmit path having a fourth variable gain amplifier, the third selectable transmit path configured to generate radio-frequency signals using a third multiple-access communication protocol, wherein the third selectable transmit path uses a direct launch signal transmission technique.

30. The transceiver of claim 29, wherein the third multiple-access communication protocol comprises at least one of Personal Communications System (PCS) and Data Communications System (DCS).

31. The transceiver of claim 22, further comprising mode selector electronics coupled to the transceiver to provide mode select functionality.

32. The transceiver of claim 22, wherein the modulator, the controllable oscillator, and the transmitter are fabricated on a single integrated circuit.

33. The transceiver of claim 22, further comprising a first switch configured to enable at least one of the first and second transmit paths to transmit a communication signal using at least one of the first and the second multiple-access communication protocols.

34. The transceiver of claim 22, further comprising a multiple channel receiver configured to receive radio-frequency signals using at least the first and second multiple-access communication protocols, said multiple channel receiver including a plurality of selectable receive channel components, the plurality of selectable receive channel components coupled to a demodulator configured to produce an in-phase data signal channel and a quadrature data signal channel; and a second switch configured to enable at least one of the receive channels to receive a communication signal using one of the first and second multiple access communication protocols.

35. The transceiver of claim 34, wherein each of the in-phase data signal channel and the quadrature data signal channel comprise a receive-side variable gain amplifier.

36. The transceiver of claim 34, wherein each of the in-phase data signal channel and the quadrature data signal channel comprise a second-order bandpass filter.

37. The transceiver of claim 34, wherein each of the in-phase data signal channel and the quadrature data signal channel comprise at least one additional bandpass filter.

38. The transceiver of claim 37, wherein the at least one additional bandpass filter has a filter order greater than two.

39. The transceiver of claim 34, wherein each of the in-phase data signal channel and the quadrature data signal channel comprise a direct-coupled offset corrector.

40. The transceiver of claim 39, wherein the direct-coupled offset corrector comprises a sample and hold circuit.

41. The transceiver of claim 39, wherein the direct-coupled offset corrector comprises a continuous servo loop.

* * * * *